United States Patent
Marino

(10) Patent No.: US 9,152,994 B2
(45) Date of Patent: Oct. 6, 2015

(54) SYSTEMS AND METHODS FOR MANAGING GLOBAL WARNING

(75) Inventor: Bruno D. V. Marino, Brunswick, ME (US)

(73) Assignee: Planetary Emissions Management, Inc., Cambridge, MA (US)

(*) Notice: Subject to any disclaimer, the term of this patent is extended or adjusted under 35 U.S.C. 154(b) by 531 days.

(21) Appl. No.: 13/089,903

(22) Filed: Apr. 19, 2011

(65) Prior Publication Data

US 2012/0084193 A1 Apr. 5, 2012

Related U.S. Application Data

(60) Provisional application No. 61/388,917, filed on Oct. 1, 2010.

(51) Int. Cl.
*G06Q 40/00* (2012.01)
*G06Q 40/04* (2012.01)

(52) U.S. Cl.
CPC .............. *G06Q 40/00* (2013.01); *G06Q 40/04* (2013.01)

(58) Field of Classification Search
USPC ............................................ 705/25, 36 R, 37
See application file for complete search history.

(56) References Cited

U.S. PATENT DOCUMENTS 6,021,397 A * 2/2000 Jones et al. ................ 705/36 R
2001/0042785 A1* 11/2001 Walker et al. ................ 235/379

(Continued)

FOREIGN PATENT DOCUMENTS

WO WO-99/42814 A1 8/1999

OTHER PUBLICATIONS

Carbon financial risk in the international greenhouse gas market Hultman, Nathan Eric. University of California, Berkeley, ProQuest, UMI Dissertations Publishing, 2003. 3105245.*
Joy. The University of Saskatchewan (Canada), ProQuest, UMI Dissertations Publishing, 2010. NR92040.*

(Continued)

*Primary Examiner* — Hani M Kazimi
*Assistant Examiner* — Hatem M Ali
(74) *Attorney, Agent, or Firm* — Wilmer Cutler Pickering Hale and Dorr LLP

(57) ABSTRACT

A closed end financial instrument for the monetization of greenhouse gases is disclosed. The closed end security has unique features providing for the securitization of greenhouse gas reductions (e.g., avoidance, sequestration, transformation) on global and sub-global scales. A universal carbon index based on the computed value for metric tons fossil fuel derived $CO_2$ from measurements of the carbon 14 isotope, directly linked to fossil fuel emissions, is also disclosed. The 14C based universal index provides a unique and novel market mechanism to value and track fossil fuel carbon across all reduction genres and measurement platforms. Sub-global indexes for 14C and other GHGs representing partial carbon budgets for specific regions are accounted for within the global budget. The global and sub-global GHG indexes may operate in real time across all GHG currency transactions constituting a live GHG trading regime. An asset allocation system, based on trace gas emissions over small to large scales is also disclosed providing a means to manage and reduce GHG emissions with market-based risk assessment versus return and modern portfolio theory paradigms. Features such as small, mid and large, growth and value are applied to GHG reduction efforts by trace gas type. The unique elements of financial mechanism, global and sub-global carbon indexes and asset allocation options provide a means to manage, reduce and monetize the burden of GHGs to the atmosphere and resultant global warming.

26 Claims, 37 Drawing Sheets

(56) References Cited

U.S. PATENT DOCUMENTS

| | | | |
|---|---|---|---|
| 2004/0117302 A1* | 6/2004 | Weichert et al. | 705/40 |
| 2007/0250329 A1* | 10/2007 | Richards et al. | 705/1 |
| 2009/0043687 A1* | 2/2009 | van Soestbergen et al. | 705/37 |
| 2010/0198736 A1* | 8/2010 | Marino | 705/308 |
| 2011/0055220 A1* | 3/2011 | Tyburski | 707/743 |
| 2011/0087578 A1* | 4/2011 | Finck et al. | 705/37 |

OTHER PUBLICATIONS

Odour and greenhouse gas emissions from manure spreading Agnew, Technical and environmental assessment of thermal insulation materials from bast fiber crops: Pless, Petra Susanne. University of California, Los Angeles, ProQuest, UMI Dissertations Publishing, 2001. 9999011.*

International Search Report and Written Opinion for International Application No. PCT/US2011/054259 mailed Dec. 16, 2011. 13 pages.

* cited by examiner 12 a

FIG. 15

| GLOBAL ATMOSPHERE BOX | | |
|---|---|---|
| TECHNOLOGY TRACE GAS PROFILES | | |
| O-CO2 | O-N2O | O-CH4 |
| Nuclear<br>Wind<br>Solar<br>Hydrogen<br>Geothermal<br>Hydro | Nuclear<br>Wind<br>Solar<br>Hydrogen<br>Geothermal | Nuclear<br>Wind<br>Solar<br>Hydrogen<br>Geothermal |
| R-CO2 | R-N2O | R-CH4 |
| Forestry C sequestration<br><br>Agriculture/Soils<br>Geologic Carbon Capture<br><br>Fuel Switching<br>Chemical Capture | Forestry C sequestration<br><br>Agriculture/Soils<br>Automotive Exhaust<br><br>Manure<br><br>Sewage | Forestry C sequestration<br>Natural Gas Leakage<br>Mine Leakage<br>Landfill Flaring |

| | GWP | RAD EF |
| --- | --- | --- |
| | CHEM FORMULA | |
| | MW | ATM LT |

1616

$CO_2e$
$CO_2 + CH_4 + N_2O + HFCs + PFCs$
$CO_2$ equivalent

---

Asset Allocation: Holding Details Biosphere Box + Conventional Securities

|  | Portfolio |
| --- | --- |
| ● Cash | 11.28 |
| ◉ Biosphere Box Securities | 43.35 |
| ◎ Foreign Stocks | 35.79 |
| ○ Bonds | 7.00 |
| ○ Other | 2.59 |
|  | 0.00 |

| GLOBAL ATMOSHERE BOX | |
|---|---|
| TECHNOLOGY TRACE GAS PROFILES | |
| O-CO2 | O-N2O | O-CH4 |
| Nuclear | Nuclear | Nuclear |
| Wind | Wind | Wind |
| Solar | Solar | Solar |
| Hydrogen | Hydrogen | Hydrogen |
| Geothermal | Geothermal | Geothermal |
| Hydro | | |

| TRACE GAS MITIGATION PROFILES | | | | | |
|---|---|---|---|---|---|
| R-CO2 | R-N2O | R-CH4 | R-SF6 | R-PFC's | R-HFC's |
| Forestry C Sequestration | Forestry C Sequestration | Forestry C Sequestration | Source Destruction | Source Destruction | Source Destruction |
| Agriculture/Soils | Agriculture/Soils | Natural Gas Leakage | Atm Capture | Atm Capture | Atm Capture |
| Geologic Carbon Sequestration | Automotive Exhaust | Mine Leakage | Soil Capture | Soil Capture | Soil Capture |
| Fuel Switching | Manure | Landfill Flaring | | | |
| Chemical Capture | Sewage | | | | |

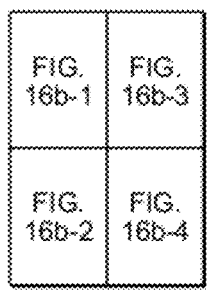
FIG. 16b
FIG. 16b-1
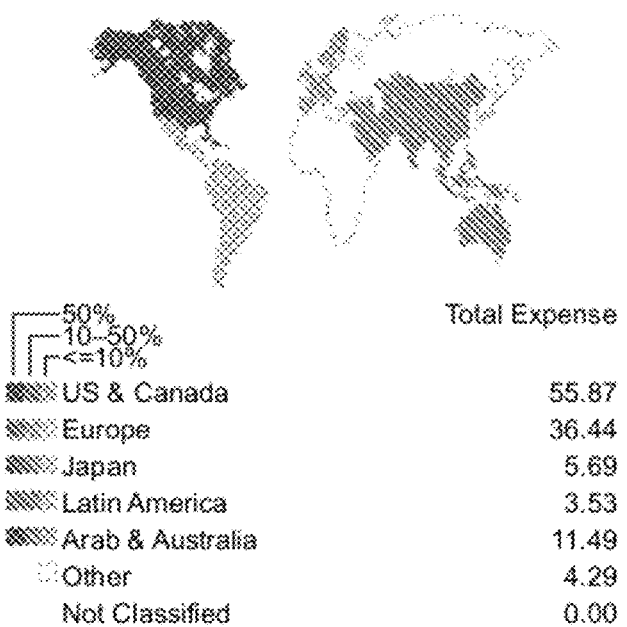

FIG. 16b-3

GHG CREDIT STYLE DIVERSIFICATION

VALUATION

| VALUE | CODE | GROWTH | |
|---|---|---|---|
| AG | GCS | FOR | LARGE |
| TREE | FOR | TREE | MED |
| TREE | GSC | UR | SMALL |

SIZE

1621

CARBON PRICING SENSITIVITY

| SHORT | MEDIUM | LONG | |
|---|---|---|---|
| AG | FOR | FOR | HIGH |
| AG | TREE | GSC | MED |
| GCS | AG | UR | LOW |

CARBON CREDIT QUALITY

| | |
|---|---|
| CO₂<br>1 GWP<br>50-100 YRS<br>$190 B<br>Large | CH₄<br>23 GWP<br>12 YRS<br>$10 B<br>Medium |
| N₂O<br>296 GWP<br>114 YRS<br>$1 B<br>Small | HFCs<br>1,700 GWP<br>11.9 YRS<br>$0.1 B<br>Small |
| PFCs<br>6,700 GWP<br>50,000 YRS<br>$0.1 B<br>Small | SF₆<br>22,200 GWP<br>3,200 YRS<br>$0.1 B<br>Small |

KYOTO 6
INVESTOR PERIODIC TABLE FOR THE SIX KYOTO
REGULATED GHG'S
&
MARKET CAPITALIZATION

Key:

GWP: Global Warming Potential (GWP, 100 year time frame). Note that GWP increases from left to right and is relative to CO2 which is assigned a value of 1.

YRS: Atmospheric Lifetime of the gas. Each gas is taken up or transformed by the biosphere over time. Note that HFC's, PFC and SF₆ are purely man made gases.

$B: Market size based on 2009 transactions data, given in USD Billions.

SYSTEMS AND METHODS FOR MANAGING GLOBAL WARNING

CROSS REFERENCE TO RELATED APPLICATIONS

This application claims priority under 35 U.S.C. §119(e) to U.S. Provisional Patent Application No. 61/388,917, filed on Oct. 1, 2010, entitled "SYSTEMS AND METHODS FOR MANAGING GLOBAL WARMING," the contents of which are incorporated herein in their entirety by reference.

This application is related to U.S. patent application Ser. No. 12/698,460, filed on Feb. 2, 2010, entitled "SYSTEM OF SYSTEMS FOR MONITORING GREENHOUSE GAS FLUXES," the contents of which are incorporated herein in their entirety by reference.

This application is also related to U.S. Provisional Patent Application No. 61/149,122, filed on Feb. 2, 2009, entitled "SYSTEM OF SYSTEMS FOR MONITORING GREENHOUSE GAS FLUXES," the contents of which are incorporated herein in their entirety by reference.

COPYRIGHT NOTICE

This patent disclosure may contain material that is subject to copyright protection. The copyright owner has no objection to the facsimile reproduction by anyone of the patent document or the patent disclosure as it appears in the U.S. Patent and Trademark Office patent file or records, but otherwise reserves any and all copyright rights.

FIELD OF THE INVENTION

The invention relates generally to methods and systems for trading Greenhouse Gas ("GHG"), in situ, according to a mechanism and method of measurement that are applicable and comparable across all mitigation sites for a specific planetary GHG ensuring material and monetary equivalence for GHG trading for one or more composite projects across all projects. The invention also relates to a method of global indexing for a given GHG and a method of asset allocation providing a market means to reduce GHG emissions and to price such emissions reductions according to supply and demand. The combined elements of the disclosure result in a unique method to reduce the burden of GHGs to the atmosphere and thus to manage and reduce the effects of global warming.

BACKGROUND

The forests of the world play a key role in providing resources for humanity including food, materials for commerce, clean water and as habitat for the planet's biodiversity. However, forests which cover about 30% of the Earth's surface currently play a relatively minor role in the management of global carbon and in the monetization of carbon. One of the reasons for this circumstance is the difficulty of measuring carbon flux over a given area of forest such that the amount sequestered can be verified and monetized. Models typically used for estimation of forest carbon flux do not capture the essential features of forest ecosystems that determine the net carbon (e.g., sequestered or emitted) of a forest. For example, below ground carbon is approximately twice as high as above ground carbon and any model or estimation that precludes below ground carbon is of no value. Yet, according to estimation routines and model programs used to infer forest carbon for carbon trading do not address soil carbon. Thus, inclusion of below ground soil carbon in methods to derive total forest carbon stores for managing and monetizing forest carbon would represent a vast improvement over current methods. Additionally, the world's forests, particularly the forests of the developing world, are under pressure from deforestation and degradation in part due to the cash value for forest products and for crops grown on deforested lands. Deforestation then is due in part also to the lack of a method to measure forest carbon and monetize it accordingly. The invention disclosed herein addresses fundamental issues related to measuring, verifying and accounting for forest carbon (above and below ground) that provides a means to manage forests on small and large scales. Effective management of the world's forests will be needed for a future where reduction of carbon concentrations in the atmosphere will be needed to slow global warming and associated climate change.

The use of a real-time measuring system, or system of systems, for forest carbon that is verifiable and can be uniformly accounted for provides the basis for monitization that can be understood by the financial community and investors. A framework in which forest carbon can be expressed in terms of shares of an investment, in some ways similar to certain types of stocks and equity funds, will allow forest carbon to be considered in terms of asset classes and investment risks in those asset classes. Investors design and adjust portfolios of investments based on risk and return. Another key component of the securitization of forest carbon is a reference or standard value benchmark that ensures that all carbon monetized is equivalent regardless of the forest location, type or other difference. Still another dimension of forest carbon essential for successful monetization is selecting a financial framework that resonates with the dynamic of forests as biological entities. Forests, for example, have defined growing seasons (e.g., summer) and periods of senescence (e.g., winter) and it is the difference between carbon sequestration in the summer and carbon release during the winter, that defines the net carbon flux as source or sink. While there is a wide range of security options those that offer periods of dormancy or features that restrict security sales/purchases for at least a period of one year are desired. In fact, if forests are to be managed for future generations, total periods of securitization should last for 50, 100 or more years. Thus, a forest carbon system that can be expressed in real terms of shares with given values and bounded by common benchmarks, as well as being compatible with longer term securities management would be essential to monetizing, managing and securitizing forest carbon. The invention described herein addresses methods to securitize forest carbon with the aforementioned features.

While the focus on securitizing forest carbon is needed, other essential aspects and intrinsic value of forests are often diminished. Biodiversity, for example is directly benefited by reductions in deforestation and degradation and, in many cases, diminishing forest habitats threaten organisms to extinction. Likewise, indigenous peoples that occupy much of the remaining forests in the developing world are themselves at risk for loss of culture and loss of forest products that define their lifeways. Thus, any additional features related to the securitization of forest carbon that ensured or placed a premium on biodiversity and on indigenous culture would be highly desirable. The invention described herein addresses methods to emphasize biodiversity and human culture by placing a premium on these features in any given forest location.

SUMMARY OF THE INVENTION

The present disclosure provides methods for GHG gas trading. At least one biosphere box comprising at least one of a terrestrial and an aquatic ecosystem is defined and is compartmentalized into at least one GHG reservoir. A first baseline GHG flux is defined for the at least one biosphere box and at least one GHG flux in the at least one GHG reservoir is measured by measuring a released and a sequestered amount of GHG in the at least one GHG reservoir. The at least one measured GHG flux of the at least one GHG reservoir is compared with the first baseline to generate at least one first resultant GHG flux data of the at least one geographically defined biosphere box. A closed-end fund is defined that comprises a plurality of traded items wherein each traded item corresponds to the at least one first resultant GHG flux data of the at least one geographically defined biosphere box.

Still another aspect of the invention provides for a system for generating GHG tradable products. The system comprises a measuring system for measuring at least one GHG flux in at least one GHG reservoir of at least one geographically defined biosphere box comprising at least one of a terrestrial and an aquatic ecosystem, wherein the at least one geographically defined biosphere box is compartmentalized into the at least one GHG reservoir. The measuring system may comprise an array of analyzers placed in predetermined representative locations throughout the at least one GHG reservoir, wherein each analyzer measures at least one GHG flux in the at least one GHG reservoir by measuring a released and a sequestered amount of GHG in the at least one GHG reservoir. The measuring system may further comprise a standard reference module for defining for the at least one geographically defined biosphere box a first baseline GHG flux.

The system for generating GHG tradable products may further comprise a data processing system for comparing the at least one measured GHG flux of the at least one GHG reservoir with the first baseline to generate at least one first resultant GHG flux data of the at least one geographically defined biosphere box, and for defining a closed-end fund comprising a plurality of traded items wherein each traded item corresponds to the at least one first resultant GHG flux data of the at least one geographically defined biosphere box.

BRIEF DESCRIPTION OF THE DRAWINGS

FIG. 15 illustrates a definition of technologies based on their trace gas footprint and reduction mechanisms ranging from zero GHG production (e.g., nuclear, solar, etc.) to mitigation strategies represented by forest carbon sequestration, etc.

FIG. 18 illustrates the Kyoto greenhouse gases, their global warming potential, atmospheric lifetime and market capitalization.

DETAILED DESCRIPTION

Figure 1:
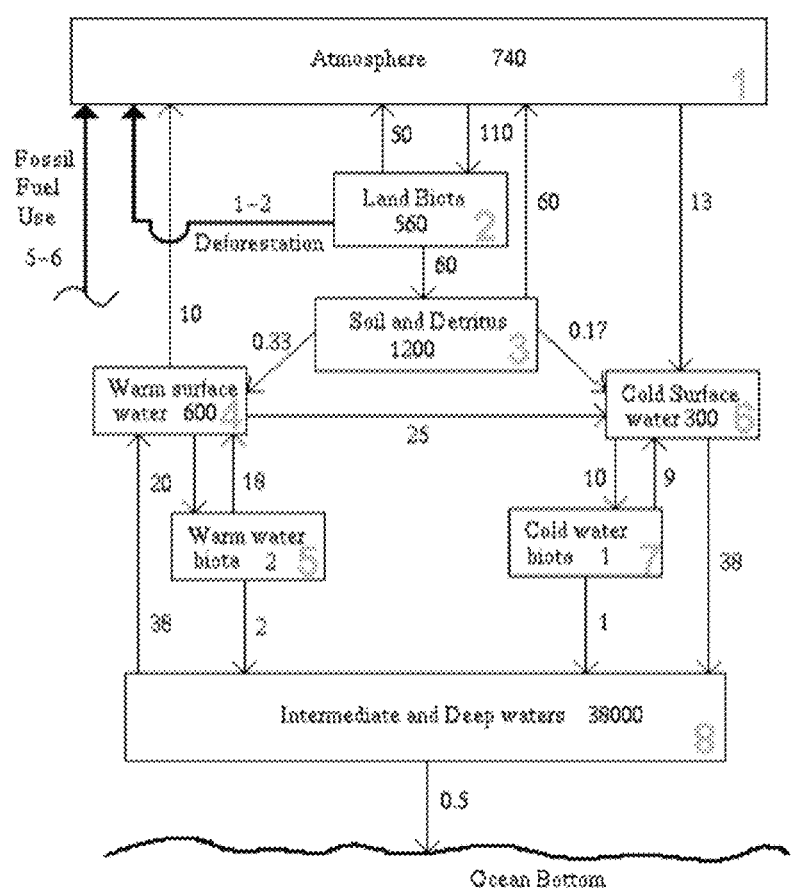
FIG. 1 illustrates a global summary of the carbon cycle showing carbon quantities, expressed in gigatons carbon ($10^9$ g), for the major carbon reservoirs and their fluxes (Dixon 1994). Note that the soil/detritus carbon pool (1200 Gt) is approximately twice that of the land biota (560 Gt).

The invention discloses the use of a closed-end financial instrument (CEFI) to be used, for example, in forest carbon trading, and as a method of standardizing carbon geospatial location for forest carbon pools/emissions. CEFI prevents double counting of carbon accounting and associated fraud. The CEFI allows a simplified means to manage and trade in situ net ecological year forest carbon (e.g., October to October) that is compatible with the dynamic, biological nature of seasonal forest and soil carbon flux and with the long term life-cycle of forests. The invention further allows real time, forest carbon sequestration management of one or more forest entities for optimized total forest carbon retention and a linked auction mechanism to value unique components of forest ecosystems such as biodiversity and ecosystem services. Pricing of the CEFI is based on supply and demand for carbon credits and offsets can be freely traded on secondary financial markets after an initial public offering, typical of closed-end securities. The use of a CEFI is integrated with a program of carbon measurement, verification and accounting (MVA) for $CO_2$ including rare carbon isotopic species ($^{13}CO_2$, $^{14}CO_2$) to determine annual net carbon flux and management of the closed-end forest financial instrument (CEFFI). The CEFI would be of little value if estimates, such as those currently, used are employed.

The CEFFI may hold one or more geographically defined forest or biosphere entities representing a composite box of underlying carbon assets and may be designated as a Biosphere Box accordingly. Such composites, regardless of global location, are defined according to a single measurement baseline ensuring monetary equivalency and fee structure across all projects. Aggregation of contiguous land parcels effectively limits project leakage.

The baseline for a CEFFI is defined by deviation from a net-zero or carbon neutral sequestration status at initiation of a credible MVA program covering the project area and over the project lifetime of 100 years or more. The historical nature of the vast majority of landscapes with respect to carbon sequestration cannot be known. Under some embodiments of this disclosure, a baseline may be established using a system of systems quantitative approach. The CEFFI disclosed herein is accessible to diverse retail and institutional investors in contrast to traditional forest investment approaches such as Timber Investment Management Organizations (TIMO) (not publicly traded) and Real Estate Investment Trusts (REIT) that must distribute 90% of taxable income each year.

Forest carbon trading exchanges and mechanisms typically treat forest carbon pricing and risk according to an on open-ended fund market model and associated exchange mechanisms (e.g., Vishwanath and Krishnamurti 2009). Accordingly, forest carbon credits of any year, representing primarily above ground carbon in disparate locations and for differing periods of time, are traded instantaneously within all securities classes (e.g., www.ccx.com; www.cantorco2e.com) including contract trading, future, spot, credit swaps, and other common financial derivative instruments. However, the underlying sources of carbon credits are the result of net annual biological carbon processing (e.g., an ecological year) and require a net annual audit to track and compute net carbon flux for a given year. Forest and soil carbon stocks are dynamic, long-lived, tangible, geophysical and biological entities that are limited in quantity and defined in space (i.e., latitude, longitude, altitude) and thus, in principle, are not suited to be traded according to open-ended security models in which shares are effectively unlimited. Rather, as disclosed herein, discrete carbon units (e.g., carbon credits attributed to geographically cataloged acres of forest) representing any number of discrete projects are held in a closed-end, composite fund structure initially sold as a fixed number of shares and held for specified periods according to a schedule of ecological year redemptions.

The aforementioned features, while typical of closed-end fund structures such as mutual funds (e.g., Cherkes et al., 2008), are not uniquely matched to ecological year forest growth patterns (e.g., annual net carbon sequestration) and ecosystem services functions (e.g., drinking water, species habitat). Redemption of forest carbon shares at biologically relevant specified times (e.g., cumulative, ecological year annual cycles) will then result in high quality, numerically computed creditable carbon units for exchange on regulatory and voluntary carbon markets. Consideration of forest carbon credits must also in many cases account for landscape ecosystem heterogeneity (e.g., Robinson et al., 2009) such as wetlands, dispersed in many forest ecosystems. Heterogeneity in forest landscapes cannot be ignored, as wetlands for example, store an estimated 300 to 700 billion tons of carbon globally, yet are not typically included in forest carbon credit approaches (Dixon et al., 1994). Forest wetlands also serve as critical habitat for many immature species of economic importance and as areas of high biodiversity. The carbon flux of wetlands when they are present within a forest ecosystem may also be inclusive of the carbon flux for a given forest project and indeed cannot be practically subtracted from total fluxes for a given area. The use of a closed-end fund structure model as disclosed herein allows for matching of the temporal and spatial biological domains of the forest carbon cycle with an efficient financial mechanism in which pricing is determined by investor demand and carbon credit and offsets supply while the number of shares remains constant.

Forest Carbon Cycle

Forests cover more than $4.1 \times 10^9$ hectares of the Earth's land area (Dixon et al., 1994). Globally, forest vegetation and soils contain about 1146 petagrams (e.g., 1 petagram equals 1 gigaton or $1 \times 10^{15}$ g) of carbon, with approximately 37 percent of this carbon in low-latitude forests, 14 percent in mid-latitudes, and 49 percent at high latitudes (Dixon et al., 1994). Over two-thirds of the carbon in forest ecosystems is contained in soils and associated peat deposits (Dixon et al., 1994) that is approximately twice as large as the carbon contained in the atmosphere (see FIG. 1). In 1990, deforestation in the low latitudes emitted 1.6±0.4 petagrams of carbon per year, whereas forest area expansion and growth in mid- and high-latitude forest sequestered 0.7±0.2 petagrams of carbon per year, for a net flux to the atmosphere of 0.9±0.4 petagrams of carbon per year (Dixon et al., 1998). Slowing deforestation, combined with an increase in forestation and other management measures to improve forest ecosystem productivity, could conserve or sequester significant quantities of carbon. Future forest carbon cycling trends attributable to losses and re-growth associated with global climate and land-use change are uncertain and require monitoring as background for all ecosystem and carbon flux programs. Despite the importance of forest carbon sequestration to the reduction of atmospheric $CO_2$, forest carbon generally has not played a major role in the EU carbon trading scheme under Kyoto Protocol rules (UNFCCC 2010) and is a minor price component of the CCX where forest carbon trading is based on estimates of greenhouse gas emissions (CCX 2010).

Direct Measurement of Forest Carbon Required In Situ

A critical factor for the success of a financial mechanism and model for forest carbon is a scalable, credible and direct monitoring, verification and accounting (MVA) program to ensure high quality data for determination of metric tons of carbon (e.g., representing carbon sequestration or release) compatible with carbon exchange platforms. Additionally, measurement of the rare forms of carbon will allow differentiation of carbon pools above and below ground as each flow of $CO_2$ imparts a characteristic isotopic signal (e.g., Yakir 2009; McDowell et al., 2004; Flanagan & Ehleringer 1998; Graven et al., 2009; Chen et al., 2006). Thus, MVA based carbon trading programs for forests can provide in situ incentives and revenue to maintain natural forests where ever they are located. For example, a recent program, The United Nations Collaborative Programme on reducing Emissions from Deforestation and Forest Degradation in Developing Countries (REDD) (UN REDD 2010) is based on financing provided by developed countries to local inhabitants of developing countries to limit deforestation. The rationale for the REDD program is to assist forested developing countries to significantly reduce global emissions from deforestation and forest degradation where land is deforested for timber or for agriculture (Venter et al., 2009; Nepstad et al., 2009). Thus, the REDD mechanism in essence provides an advance of cash-based carbon credits to avoid deforestation and does not involve a typical carbon trading mechanism since payments are not directly linked to specific parcels of land or to any monitoring, verification and accounting effort. However, credible MVA programs in the regions of deforestation could provide an in situ market for forest carbon while at the same time provide other benefits such as community based preservation of biodiversity (Venter et al., 2009) and indigenous culture to inhabitants. Thus, a dynamic, real time carbon flux MVA, system of systems installed within developing countries and their native forests would allow indigenous peoples to retain management control of the native forests at no cost to the developing countries. Moreover, even after over a decade since the Kyoto Protocol has been in effect, commercially available MVA systems and systems of systems to reliably track carbon are not in place. Thus, a method to provide MVA capability to forests in general could also be utilized in developing countries offering a means of in situ revenue to local inhabitants and indigenous peoples that is independent of foreign funds.

Forest Carbon Pools

Figure 2:
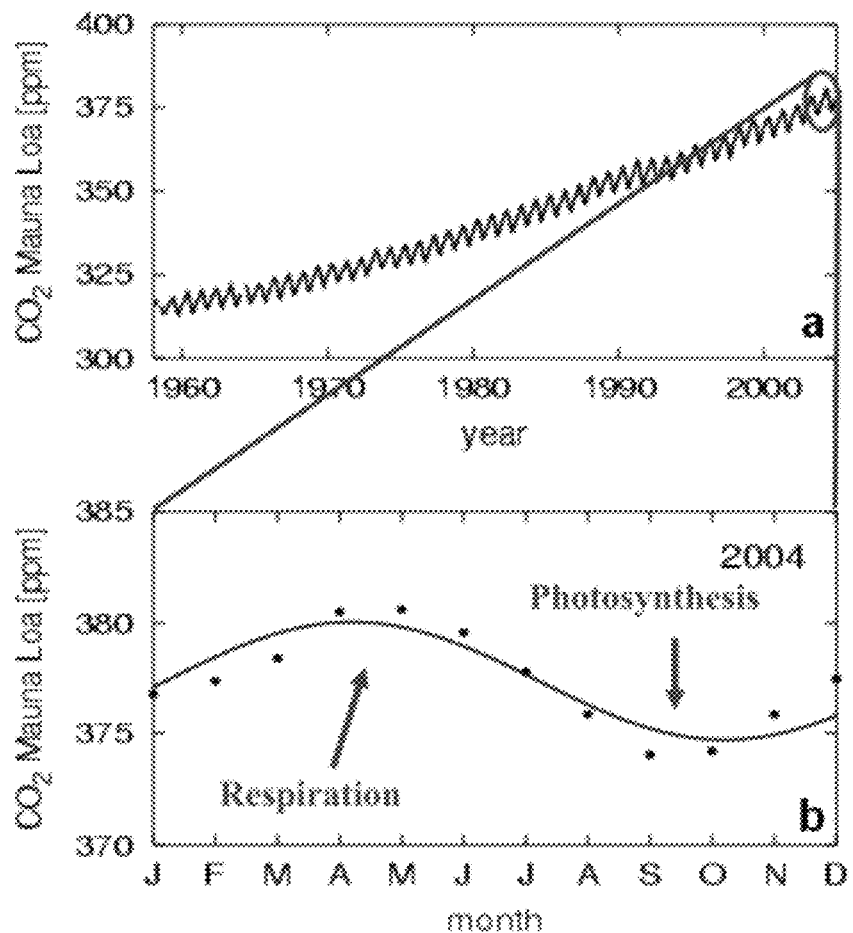
FIG. 2a illustrates the global trend and annual record for the concentration of atmospheric CO2 spanning the years 1958 to 2004, Mauna Loa, Hawaii.
FIG. 2b illustrates the seasonal components of CO2 concentration over an ecological year or annual period specific to calculations of net carbon sequestration.

The vulnerability of models and estimates of accounting for carbon in forests is, in part, related to the model treatment of carbon pools and their dynamic behavior in forest ecosystems. The seasonal cycle of biological uptake of $CO_2$ by plants in the spring and summer is followed by release of $CO_2$ in the form of respiration including that from soils. Thus, a full seasonal cycle, or ecological year, is required to calculate an annual net carbon balance, which is either negative indicating a carbon sink or positive indicating a carbon source. Referring to FIG. 2a, the characteristic seasonal cycle of $CO_2$ is illustrated for the period 1958 to 2004, showing the secular increase in $CO_2$ due to fossil fuel emissions. FIG. 2b illustrates the release of $CO_2$ during the winter months due to respiration and draw down of $CO_2$ during the spring and summer months due to photosynthesis at local scales. Note that the characteristic cycle of $CO_2$ in FIG. 2a is best described by an ecological year, from October to October, rather than by a calendar year. When considering large areas of forest (e.g., 100,000 to 1,000,000 acres) a correct temporal accounting is required and thus the invention disclosed here utilizes accounting on an ecological year basis. Additionally, while nearly all carbon sequestration forest models appear to include above ground biomass and a variety of carbon pools (e.g., live/dead trees, forest floor litter) few contain realistic dynamic below ground soil carbon pools including labile and mineralized forms of carbon, fine and coarse root structures and decomposing organic carbon in the upper most layers of the soil profile. Few appear to track forest carbon according to ecological years, but rather in calendar years. Additionally, and as important, are changes in temperature and water content of the soil column, both primary determinants of soil respiration and both projected to change according to ecosystem models under a global warming scenario (e.g., Ababneh & Woolfenden 2010; Wu et al., 2010). Yet, as noted in FIG. 1 previously, below ground carbon stores are estimated to contain from one-half to two thirds as much carbon as above ground biomass (IPCC 2010). Thus, models and estimation methods that do not represent soil carbon pools and their dynamic responses to climate change are potentially flawed and cannot be considered reliable for net forest carbon flux to be used for carbon offsets and trading (e.g., Curtis et al., 2002). Moreover, wide variations in results for creditable carbon using specific model estimations approaches based on tree growth algorithms (e.g., CCX, DOE 1605b, and VCX) differ by as much as 80% (Foley 2009). In summary, traditional methods of forest carbon estimation are not suitable to quantify the soil carbon pool or to account for the dynamic movement of carbon between forest components. The dynamic movement of carbon through the forest and soil pools and the atmosphere may be affected by local and regional weather patterns, including extreme effects (e.g., drought, hurricanes, etc.) affecting soil moisture and soil respiration (e.g., Wang and Polglace 1995), historical land use changes, forest age (e.g., Suchanek et al., 2004), recent forest management practices and climate change (e.g., Gulden et al., 2006). Additionally, it is likely that forests also sequester local and regional fossil fuel derived $CO_2$ in many areas providing potentially a source of carbon offsets for production of electricity/power production from fossil fuels (Marino 2009). Thus, it would be highly advantageous to have a method that quantifies the primary carbon pools of the forest (e.g., above ground and below ground carbon), quantifies fossil fuel inputs as well as a method that tracks the dynamic movement of carbon between forest carbon pools and the atmosphere within a quantitative framework that can also be transformed into verified carbon credits.

Traditional Methods for Determination of Forest Carbon

Traditional methods for determination of forest carbon pools are well known to those skilled in the art of forestry and are guided by a simple set of methods and equipment (e.g., MacDicken 1997). Traditional forestry methods are intended to be limited to designated sample plots that are revisited on a periodic basis. Traditional methods for determination of forest carbon sequestration is thus limited by cost factors as only a small sample of trees in any given forest can be manually and intensively measured for a variety of biometric and allometric parameters (e.g., diameter of a tree at breast height). However, since many forests are heterogeneous in species composition, physical terrain, and soil composition, traditional approaches are clearly not technically suited for the challenge of monitoring, verification and accounting of forest carbon trading over large and potentially changing composite forest landscapes. The limitations imposed by traditional methods are removed by MVA programs that employ rapid sampling of $CO_2$ (e.g., <10 Hz) with appropriate equipment including for example, eddy covariance towers, to sample the forest atmosphere (Gulden et al., 1996; 2006) and soil chambers and gas probes to sample the soil atmosphere (Mellillo et al., 2002). In these cases, the concentration of $CO_2$ and its rare forms (e.g., $^{13}CO_2$, $^{14}CO_2$) provide integrated measures of specific forest carbon pools in a given area over diurnal, seasonal and annual cycles. The precision of these methods are known to be +/−0.3 metric tones (Mt) C or less (e.g., Goulden et al., 1996). While traditional forest methods and eddy covariance methods may yield similar results in some cases it is important to note that traditional forestry methods employ static measurements carried out intermittently representing a small subset of the forest and averaged over a number of years. In contrast, eddy covariance approaches typically record daily continuous integrated flux of all forest carbon flows (positive and negative) for a given area and yield seasonal and ecological year detailed changes in net forest carbon flux (e.g., Urbanksi et al., 2007). A quantitative measurement approach provides mechanistically appropriate data with carbon trading approaches utilizing ecological year net carbon values in a closed-end financial structure consisting of one or more forest assets as contained in a composite Biosphere Box.

Baseline, Permanence and Leakage Constraints for CEFFI

Figure 3:
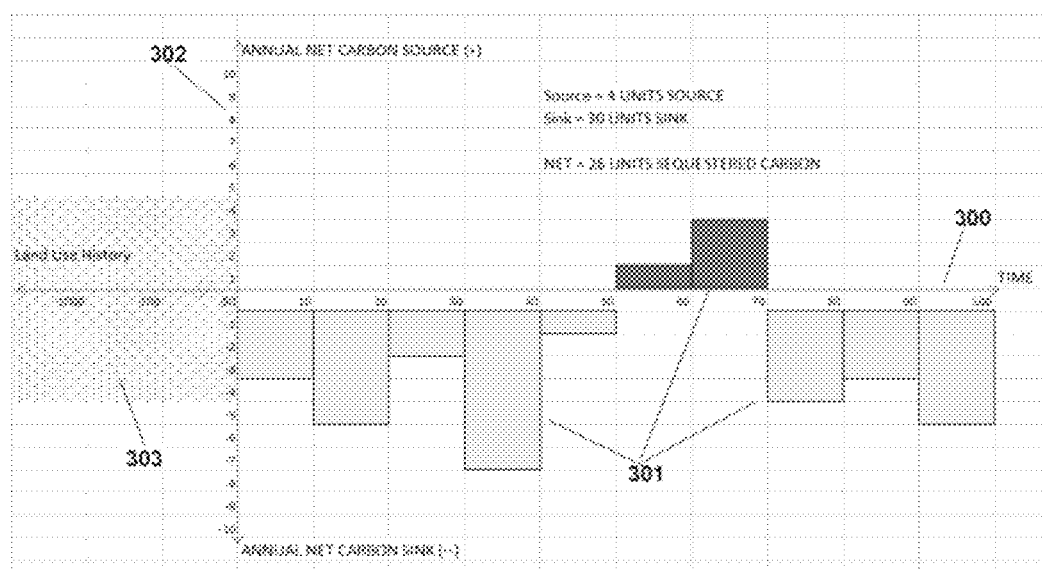
FIG. 3 illustrates a simple accounting method to accrue annual net carbon flux as either negative representing a carbon sink, or positive representing a source of carbon to the atmosphere. The data are provided relative to an assumed, arbitrary net-carbon zero or neutral baseline (i.e., carbon source and sink are equal). Estimated historical trends for carbon flux are shown in the stippled area to the left of the y-axis but not specified. Detailed land use data for a given area may or may not be available; however, such trend data would likely be of limited use without flux data as required for the approach disclosed herein.

A successful forest carbon trading framework (e.g., CEFFI) must address several intrinsic features that are specific to carbon and greenhouse emissions and include: 1) establishing a baseline, 2) ensuring permanence, and 3) preventing leakage. Currently, these features represent significant uncertainties to all carbon trading programs and to forest carbon trading paradigms specifically (e.g. Karky & Skutsch 2010; Abate & Wright 2010; Foley et al., 2009). The CEFFI disclosed herein provides for universal implementation across all projects for the three features discussed above. The CEFFI is well suited to address all three issues. Regarding a baseline the CEFFI allows for an immediate baseline relative to zero net forest carbon sequestration as illustrated in FIG. 3 (300, 301). In other words, a baseline is established at the time of carbon flux monitoring and represents a line of net zero source/sink. This approach is a reasonable one given that every ecosystem will be in a different state at initial determination of carbon sequestration and will evolve differently. Establishing a baseline in any other fashion places an immediate bias on the project with the exception of parcels of land for which detailed history (303) is well known and accompanied by quantitative data on carbon flux; such circumstances are rare and not typical of vast forest areas. The use of a net-zero baselines requires that all projects across space and time will be based on the same net-zero line and that all projects will have the same references and standards framework such that all measurements are consistent and accurate across all projects. Regarding the related issue of permanence this aspect is readily accomplished by ensuring that all project assets based on longitude and latitude are restricted to long term provisions of the project area, preferably designated in 100 to 200 year increments total time but broken up into smaller 10 year or other increments as desired and as illustrated in FIG. 3. The x-axis of 100 or more years 300 shows decadal intervals of carbon net annual ecological carbon sequestration 301 with magnitude given by y-axis 302. A historical record of land use history 303 predates the initiation of an MVA and CEFFI project and thus can only be crudely estimated in the vast majority of cases. Conservation easements are clearly well suited to establish permanency from a legal perspective linking landowners to easement registration (e.g. Zheng et al., 2010; Bray 2010). Natural events such as hurricanes, droughts and plant diseases cannot be predicted and thus a forest carbon project, or carbon asset, can be rendered back to the atmosphere. Thus, in reality there is no assurance of permanence for carbon in the primary carbon pools as the carbon cycle itself is continually transformed within the biosphere.

Figure 4:
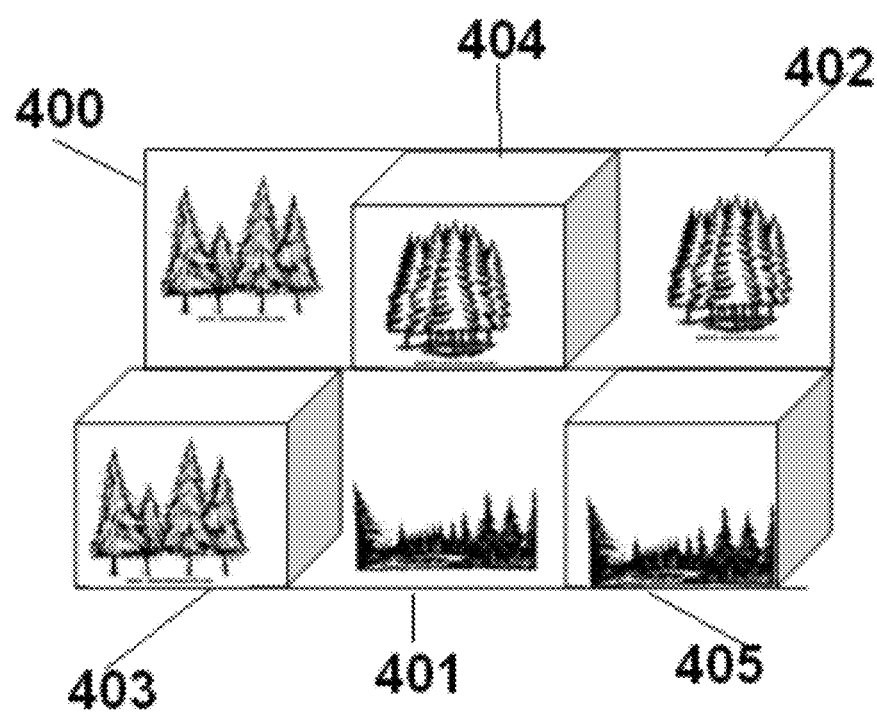
FIG. 4 illustrates management of leakage by aggregating contiguous lands that are not defined by a CEFFI and thus the magnitude and influence of leakage can be controlled. Programs to close up "leakage" can be addressed over time and/or mandated by state legislation.

The issue of leakage can be addressed in the same fashion as for permanence and being defined as a tangible project area with known geophysical coordinates (i.e., latitude and longitude). Each of the defined CEFFIs represents a partial carbon budget defined in space and time as illustrated in FIG. 4 showing areas or patches of land that are not under an MVA and CEFFI project 400, 401, 402 and that are interspersed with defined MVA and CEFFI projects 403, 404 and 405. Thus, leakage in the context of implementing the CEFFI disclosed herein can be defined for purposes of leakage reporting and management of lands not linked to a partial carbon budget. Leakage beyond the project area in which no CEFFIs exist cannot be considered valid unless credible MVA data are available for a defined area in proximity to or close to an existing CEFFI. Thus, the preferred method to prevent leakage is to use the CEFFI approach over large contiguous landscapes by aggregation and according to the example in FIG. 4, land parcels represented by 400, 401 and 402, could be acquired or linked to reduce leakage from contiguous parcels and so on until the entire forest area in a specific location representing city, county, state, region and country scale leakage boundaries are defined. In some cases, small scale land ownership that is peripheral to or bound by CEFFI projects may be assessed for extension of CEFFI project data to these lands assuming that forest structure and species composition are similar. However, as disclosed above, the CEFFIs define partial carbon budgets and thus the management of leakage can lead to inclusion of selected parcels of land that may lead to contiguous boundaries as lands are progressively added to one or more CEFFIs. Individual states may define leakage on a state-wide scale defining parcels of land according to natural climatic zones or similar physiographic regions and have an option of enacting state level legislation incorporating cap and trade provisions as well as practical options as described above to address leakage.

Composite Biosphere Closed-End Model: The Biosphere Box

Figure 5:
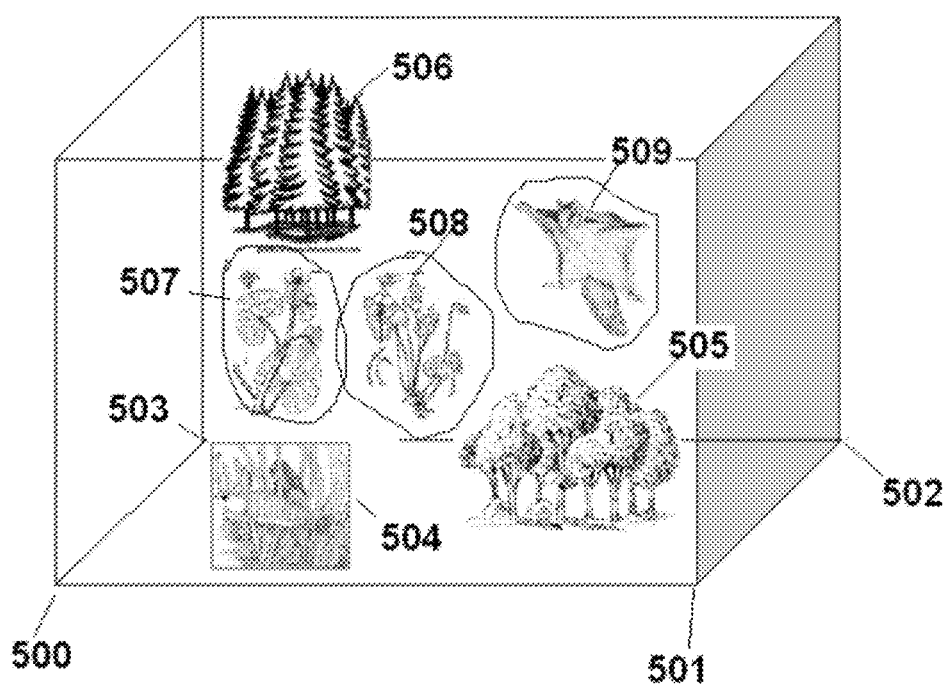
FIG. 5 illustrates a hypothetical biosphere box with geographic boundaries and containing two forests, an aquatic ecosystem, 2 endangered plant species and one endangered animal species. The circled entity is linked to an auction mechanism providing funds for management of such endangered species derived from the highest bidder.

Heterogeneous land cover is characteristic of natural ecosystems including forests of the world, whether in northern Boreal, temperate or tropical locations. Since it is highly unlikely that large areas of natural land cover will be identical the use of a composite feature for the closed-end approach disclosed herein is required. A closed-end model with a composite of underlying CEFFI projects from diverse locations around the world is disclosed that may reduce variance and volatility of the composite taken as a whole compared to any one project that may be subject to high volatility. FIG. 5 illustrates a composite closed-end structure represented by a box for visualization that contains distinct and contiguous CEFFI projects bounded by latitude and longitude, 500, 501, 502 and 503, recognizing that each underlying project has individual latitude and longitude definition. Distinct projects, according to the illustration in FIG. 5, include a wetland ecosystem 504, a deciduous forest 505, and an evergreen forest 506 as well as endangered plant species 507 and 508 and an endangered animal species 509; all such endangered species are encircled with a dashed line for identification. The endangered plant and animal species may be common to only one or to more than one ecosystem as such animals and plants are often widespread amongst related ecosystems and in the case of animals may forage widely amongst many adjacent ecosystems. The entire ensemble of CEFFI projects and plants and animals represent a composite within a single holding or box of projects. Accordingly, such a closed-end structure with distinct underlying projects is herein designated a Biosphere Box. Such a box may contain forest projects from northern and southern hemispheres offering anti-correlation of the timing of carbon dynamics as the northern hemisphere experiences summer while it is winter in the southern hemisphere. Likewise, forest projects located in the southern and northern as well as eastern and western parts of the US are likely to offer differing carbon sequestration options and condition according to weather patterns, soil conditions and land use pressures. Thus, a biosphere box is likely to reduce the overall volatility for carbon projects and perhaps net carbon sequestration versus holding a single CEFFI project in a single location.

Forest Biodiversity and Endangered Species

Forest ecosystems contain the greatest diversity of species found in any terrestrial ecosystem, and the status of biodiversity is, in itself, an indicator of forest condition (Matthews et al., 2002). Forests encompass biodiversity at the ecosystem level, the species level, and the genetic level. Forest ecosystems and intrinsic biodiversity provide a host of ecosystem services that are not easily replaced by humans, such as providing drinking water through natural water sheds, selected wood for manufacturing, and beneficial insects including pollinators (e.g., Ribaudo et al., 2010). Forest management practices and deforestation can have deleterious effects on biodiversity. However, despite the importance of forests to biodiversity and ecosystem services few approaches to forest carbon trading take these beneficial factors into account (Shoo 2010; Venter et al., 2009). For example, in the invention disclosed herein selection of a CEFFI project that also comprised an endangered plant or animal as illustrated in FIG. 5 (507, 508, 509), can also be beneficial to the preservation of such endangered species indirectly as results from the requirement for long term carbon sequestration as described above and illustrated in FIG. 3, but also according to a linked but independent option of an auction process as described below. Thus, it would be advantageous for the value and preservation of forests to apply a carbon trading method that links the biodiversity in forests to the carbon assets of a forest.

Financial Structures Common to Forests

Forest investment structures have played a role in shaping the economic value of large tracts of land and are associated with land development as a means to increase revenue and return of investment for investors. The two most common forest investment mechanisms are Timberland Investment Management Organizations (TIMOs) (Dixon 2006) and Real Estate Investment Trusts (REITS) (Hudgins 2007). Both mechanisms are designed to: 1) produce high total returns and capital appreciation for investors, 2) require ownership, and 3) require some form of annual distribution of taxable income (e.g., specifically not suited for long term carbon sequestration goals). TIMO's are not traded on secondary markets (Gorton & Pennachi 1993; Binkley 2007) and thus inaccessible to most investors. In TIMO's and REIT's, holdings of forest lands are often sold as real estate investments to generate revenue (Binkley 2007). An additional class of emerging forest investment is based on the securitization of forest carbon in the form of bonds. So called "forest bonds" are envisioned as government backed securities (e.g., www-.forestbonds.com) and are an extension of the green bond concept being actively promoted by the IMF, the World Bank and the UK government (www.imf.com). Bond issuance serves a long term objective for forest preservation but represents a fundamentally different securitization mechanism than that disclosed herein based on equity markets. To those skilled in the art of securities it is well known that bonds represent loans made by investors to companies and other entities, such as branches of government, that have issued the bonds to attract capital without giving up managing control. A bondholder, in effect, holds an IOU, the antithesis of ownership of an equity based security. Additionally, every bond carries the risk that a promised payment will not be made in full or on time. As uncertainty of repayment rises, investors demand higher levels of return in exchange for assuming greater risk. An equity based security is thus, the forest bond model is as different from the model disclosed herein as bonds are fundamentally different from equities. Importantly, however, the forest bond model is not based on the monitoring of ecological year forest carbon flux on an annual basis to ultimately determine the value of the forest carbon in a quantitative framework through time. The forest bond concept is envisioned as issued from governments of forests residing in a given country and thus are limited by a given countries ability to issue, secure and manage forest bonds. Since most of the world's forests are in developing countries (e.g., Indonesia, India, Africa) a forest bond approach would likely be problematic as such countries will not typically be able to secure such forest bonds and thus are impractical for most of the planets forests and of limited commercial application. A concrete example of this impractically of developing countries to manage their forests is embodied in the Reducing Emissions from Deforestation and forest Degradation (REDD) in developing countries. The REDD program essentially provides money in the form of payments raised from developed countries to owners of land in developing countries to prevent deforestation. Moreover, the financial structure of the REDD funding paradigm is not in the form of forest bonds, demonstrating the impracticality and unsuitability of a bond, fixed income structure for forest carbon trading and management. The highly complex nature of forest management to optimize carbon credits and reduce deforestation cannot be addressed by bond security structures or by a pure equity structure. The CEFFI Biosphere Box financial instrument disclosed herein, based on a closed-end equity fund model, is distinct from both fixed income and pure equity securities, specifically suited for holding diverse forest carbon assets over long periods of time. The CEFFI also allows shareholders to invest in forest lands without ownership, provides for biologically meaningful redemption periods, creates permanence, preserves biodiversity and allows for management of the forests over time to increase carbon sequestration. Thus, TIMOs, REITs and forest bonds are not materially tied to the dynamic changes in carbon-based assets nor designed to manage the carbon and biodiversity assets on a dynamic basis within a forest for the purposes of carbon trading. The CEFFI, as disclosed herein, is well suited to practically deal with the complexities of forest carbon trading and represents a mechanism that can be readily implemented with monitoring, verification and accounting protocols as described in U.S. patent application Ser. No. 12/698,460, entitled "System of System for Monitoring Greenhouse Gas Fluxes," the entire contents of which are incorporated herein by references in their entirety. Thus, it would be highly desirable to employ a financial instrument for forest carbon that is compatible with land holding provisions based on dynamic measurement, monitoring, verification and accounting of carbon flux and or/management for carbon flux and related forest assets.

Environmental Finance

Carbon is traded on a variety of voluntary (e.g., CCX 2010) and regulatory financial platforms (EU ETS 2010) and consists largely of project documentation in accordance with regulations covering registration and compliance. Carbon sequestration is largely based on estimation to qualify for a carbon credit or offset (e.g., CCX, 2010). However, greenhouse gases can be quantified as representing real physical quantities and can be directly measured using a variety of techniques. Thus, while financial mechanisms are applied to carbon trading (e.g., derivatives, futures, spot pricing, etc.) there is an assumption that value is adequately represented by estimation. Carbon credits as approved by a particular platform are entered into contracts and brokerage transactions that characterize financial markets, for example, commodities markets. As a further example of current means of carbon credit generation, US 2007/0192221 published Aug. 16, 2007, as practiced by the Chicago Climate Exchange (CCX), provides for a computer generated estimation of forest carbon in terms of a futures contract. Despite the fact that yearly "vintages" are designated in forest projects, such annual demarcations are not utilized as a biological definition and as a measurement point to calculate net carbon flux for a given forest area for an ecological annual period and are not securitized in any manner utilizing measurement or within an appropriate financial instrument, such as the closed-end fund model as disclosed herein. Thus, assumptions regarding accuracy of carbon quantity for any given trade or exchange, particularly in the case of CCX forest carbon, cannot be relied upon. Estimations of forest carbon sequestration rests on numerical factors applied uniformly over vast areas of the US (CCX 2010) and globally and are thus intrinsically uncertain. Fees associated with transactions to establish forest carbon projects may also limit projects by size and forest composition. However, no single means of assessing a consistent fee for carbon data over all forest projects is available, in part due to the lack of landscape scale real-time monitoring, verification and accounting methods that are comparable and equivalently monetized. Instead, large differences in transaction fees are found to be associated with a particular estimation method (e.g., Galik et al., 2009). Thus, it would be highly advantageous to use a method that actually accounted for annual ecological carbon flux in forests based on measurements revealing a physical quantity in the spatial and temporal domains as well as providing for a single method with defined costs for services. Under some embodiments, the current disclosure provides real-time monitoring of carbon fluxes at appropriate scales and across vast landscapes to reduce the uncertainty of carbon pricing.

Compatibility of Financial Mechanisms with Biological Forest Carbon

Closed-end funds offer the ideal financial instrument for trading forest and soil carbon due, in part, to the illiquid biological nature of forest carbon. Moreover, the limited spatially defined and quantitative stores of the carbon entities and the annual accounting of carbon that is required to verify net carbon as sink or source in these systems and thus suitability for carbon credits are well suited for a closed-end financial approach. As shown in FIG. 2b, the net ecosystem exchange (NEE) of a forest can only be calculated on an ecological year basis as shown for the year 2004 (FIG. 2b) as discussed previously. The same biological dynamic fixation of annual net carbon on local scales can be applied to any area of forest or other type of vegetation.

FIG. 6a illustrates results of direct measurements of annual net carbon sequestration for the Harvard Forest, Petersham, MA (e.g., Wofsy et al., 1993; Goulden et al., 1996; Barford et al., 2001; Urbanski et al., 2007). The data set illustrates a 13 year period of forest carbon measurements yielding net ecosystem exchange (NEE) (e.g., Barford et al., 2007) representing the net carbon retained or released by the forest given in mega-grams carbon per hectare per year (MgC/ha/yr—note 1 megagram is equivalent to 1 metric ton; an ecological year is used to calculate net carbon flux). The study was conducted at the Harvard Forest, MA (Barford, et al., 2001). Note that the inter-annual variation in carbon flux ranges from approximately 1 MgC/ha/yr to approximately 4.7 MgC/ha/yr over the 13 year period. While the data clearly show net sequestration (e.g., values are negative relative) the year to year variation is substantial such that without an MVA program, redemption of a hypothetical Biosphere Box holding one or more CEFFIs for any given year would have a strong effect on redemption price. Thus, a single year of net flux is not adequate for carbon trading of forest carbon.

Carbon sequestration rates increased systematically and nearly doubled over the 13 year period despite the forest age of 75 to 100 years. Note that the two outliers, 1998 and 2001, are related to severe weather conditions (Barford et al., 2007) and interrupted the growth trend with sharp declines in net ecosystem exchange on hourly and monthly timescales but note that the long term trend and inter-annual variation persisted. Thus, in cases where actual direct carbon data are available, forests show high annual and inter-annual variations in carbon sequestration which when multiplied over large areas could propagate large errors in forest carbon pricing and trading.

Note that in FIG. 6b an increase in above ground biomass given in MgC/ha is clearly indicated, however, the data in FIG. 6b, representative of traditional forestry methods does not provide ecological year net carbon flux nor resolution to track severe weather anomalies that are shown to interrupt long term patterns of sequestration. The areal extent and timing of a forest carbon based project could range from small to large parcels (e.g., 1 hectare to millions) and extend from 1 year to a decade to a century or more with unique projects from different forest areas representing a composite closed-end fund or Biosphere Box. Composites are suitable for forest carbon trading due to the high variance of the underlying primitive carbon assets, as demonstrated for the Harvard Forest data, as well as the potentially illiquid nature of large tracts of land (Gorton & Pennacchi 1993).

In contrast, securities typically do not have geographic-linked coordinates by which they are defined in asset value. Two exceptions are represented by land investment structures defined (e.g., TIMOs, REITS) previously wherein land, most often undeveloped, is held for purposes of appreciation. However, these entities are not involved nor structurally equipped with MVA programs nor are they valued for ecological resources but primarily for commercial development value. Thus, it would be highly advantageous to employ a CEFFI Biosphere Box approach to trading and valuing forest carbon that is linked to geographical coordinates of the land parcels. Such land coordinates can be established with <1 meter accuracy and tracked with GIS mapping software. Thus, the closed-end approach coupled with exact boundaries for a given project area prevents double counting and fraud, therefore resulting in risk reduction.

Specialized Biosphere Auction Provisions within a Biosphere Box

Carbon stores as preserved in forests and other ground cover as well as below ground carbon can also be traded via an auction system offering, in effect, a unique retail and institutional non-Kyoto mechanism to preserve rain forest, wetlands, endangered species and biodiversity. Note that auction of carbon allowances, offsets and credits are a policy feature of cap and trade platforms either currently operating (Hahn & Stavins 2010; Murray et al., 2008) or potentially operating as a result of legislation (Fell at al., 2020). However, these auction systems do not address the limited scale and defined features of ecosystems as disclosed herein and are transacted on very specific and rules based exchanges. An auction system would function by identifying high value attributes of an area of land cover/forest, such as locations of rare plant or animal species in a diminishing habitat as referred to in FIG. 5 (507, 508, and 509) and offering for auction the protective rights of such an area and for such a species to the highest bidder. The highest bidder would, in effect, receive a certificate representing protected high value forest assets within the context of a carbon trading system and thus the certificate bears the successful auction price and value relative to the entity (e.g., endangered species) and to the carbon sequestration potential of the parcel of land. This approach links revenue producing transactions, carbon trading and biodiversity protection in one securities structure and transaction. The funds from auctions as described could be used to further deter deforestation and engender local preservation and cultural practices that value biodiversity thus reinforcing an in situ method compatible with indigenous ownership and independence from foreign influence. Funds collected from carbon trading and auctions could be used to increasingly monitor carbon fluxes with specialized instruments and to manage regional forest parcels to enhance carbon sequestration and/or economic products accordingly. Thus, it would be beneficial to employ a financial transaction and mechanism that is flexible in terms of spatial representation and that could be used to deter deforestation utilizing a non-Kyoto mechanism.

The proposed use of a closed-end fund structure as disclosed herein as a CEFFI allows for flexibility of spatial representation of the carbon cycle with an efficient financial mechanism while the auction feature provides an effective non-Kyoto mechanism to preserve indigenous culture, biodiversity and primary rainforests world-wide. Voluntary markets appear to the most suitable markets for such an auction approach and could be linked to well-known auction platforms such as e-Bay as disclosed in U.S. Pat. No. 7,650,307 issued on Jan. 19, 2010. At the time of this disclosure eBay hosted one entry for "carbon credits" listed as: "10 ton carbon credits produced by planting of "200 trees" that will when combined sequester one ton of carbon over the course of 10 years" (www.ebay.com). It is clear that an auction system of the type that is disclosed herein requires linkage to a larger carbon trading context such as that represented by the closed-end biosphere box. The lack of context represented by the eBay "10 ton carbon credits" does not provide a context in which certification of such credits can be assured. Indeed, there is no commercial system of systems that can be employed to assure credits as valid. Thus, it would be highly desirable to employ a linked auction system within a defined context for quantitative carbon trading certifying the validity of auction items.

A Closed-End Financial Instrument is Uniquely Suited to Forest Carbon Trading

A novel and spatially discrete financial mechanistic approach for carbon trading particularly in the case of forests, plantations, fields, crops and all ground cover would have to offer features that are essential for carbon stocks to be valued correctly. One such aspect of a preferred approach, a closed-end composite fund model approach, is suited for illiquid investments as is known to anyone skilled in the art of investment vehicles. In the case of forests the closed-end structure or box of forest entities literally is defined by exact geographic coordinates. Liquidity is typically referred to as instantaneous conversion of stocks to cash or to other investments. Carbon in the soil or in standing biomass is taken up by photosynthesis and released by respiration on a daily basis but such changes cannot be reliably used for trading since the net forest uptake on a seasonal basis and ecological year defines the net carbon lost or sequestered. In addition, daily, weekly and monthly carbon fluxes are responsive to variance in water, temperature, nutrient and sun conditions all of which can vary by many factors (e.g., a factor of 2 as shown in the Harvard Forest previously, FIG. 6) over any given short term period. In the short term, then, the pricing of carbon could be in error by as much as the variance of carbon fluxes due to changing monthly weather patterns. In this sense forest carbon stocks are quite illiquid due to the intrinsic uncertainty in pricing (e.g., volatility) and asset value on short time scales. The emerging sequestration pattern of a parcel of land may also be attractive for active management to increase carbon sequestration or to harvest high value, low volume products from the forest. From a management perspective, a closed-end model structure is well suited for forest carbon and forest industry products that require active management as closed-end funds are typically actively managed towards a specific investor goal; in this case increased value from carbon sequestration. Thus, it would be beneficial to have a financial transaction and mechanism that is structured and suited for the illiquid nature of forest carbon trading, the necessity for management of the carbon assets, while also offering a composite structure in which variations are collectively processed some cancelling out others, or remaining stable while one or more components or carbon projects experiences large loss. The closed-end fund model approach is also advantageous with respect to pricing or net asset value (NAV) determined by investor demand and trading at any time of the day, in contrast to open-ended fund structures where NAV is calculated at the end of every day. Thus, the closed-end model structure allows for potential appreciation of underlying carbon assets as demand grows versus supply of carbon credits. The proposed use of a closed-end fund structure allows for the matching of the illiquid nature of the carbon cycle, pricing based on demand, composites of diverse projects and carbon flux volatility with an efficient financial mechanism.

Further, carbon stocks in above and below ground biomass can have highly variable quality due to a number of factors including historical land use and disturbance, geological, climatic and biological factors. In contrast, securities that are traditionally traded in open end funds are typically "homogeneous" one share to the other within the same class of security as would be known to anyone skilled in the art of investment vehicles and securities. In a parcel of land with edges that are different from core, interior areas with respect to biological diversity, geological makeup, habitat usage, ecosystem function (e.g., clean water), a higher value may be assigned to such areas as also illustrated in FIG. 4 with reference to the related issue of leakage. Thus, it would be advantageous to have a financial transaction and mechanism that is structured and suited for the variable (e.g., heterogeneous) and additive nature of the land and biomass characteristics in a given project area. Such a consideration can be accommodated by the closed-end fund model in that the parcel size and shape of the landscapes to be offered may vary from a square meter to one hectare or many hectares, essentially defining the landscape according to desirability. The proposed use of a closed-end fund structure with an auction component allows for the variable nature of the carbon cycle due to a variety of factors including historical land use and disturbance and can account for highly valuable related features within the biosphere with a linked efficient financial mechanism.

Figure 7:
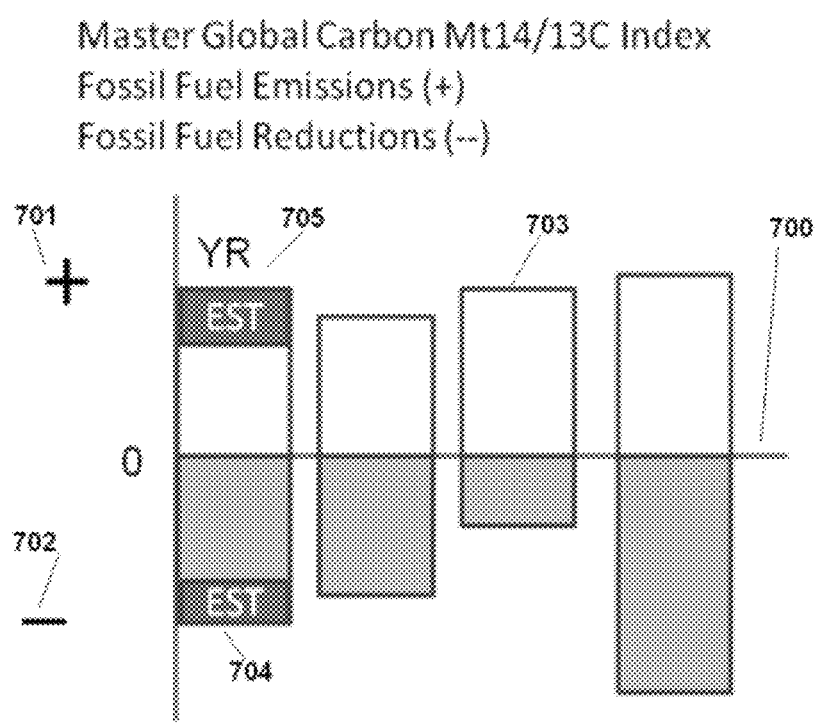
FIG. 7 illustrates a global master index of carbon based on 14C methodology to determine fossil fuel related emissions both as avoided (i.e., were never produced due to an avoidance process) and sequestered emissions (i.e., fossil fuel CO2 was produced but then captured and sequestered by a variety of approaches). The same data could be reported to cover biogenic carbon emissions on a global scale.
Figure 8:
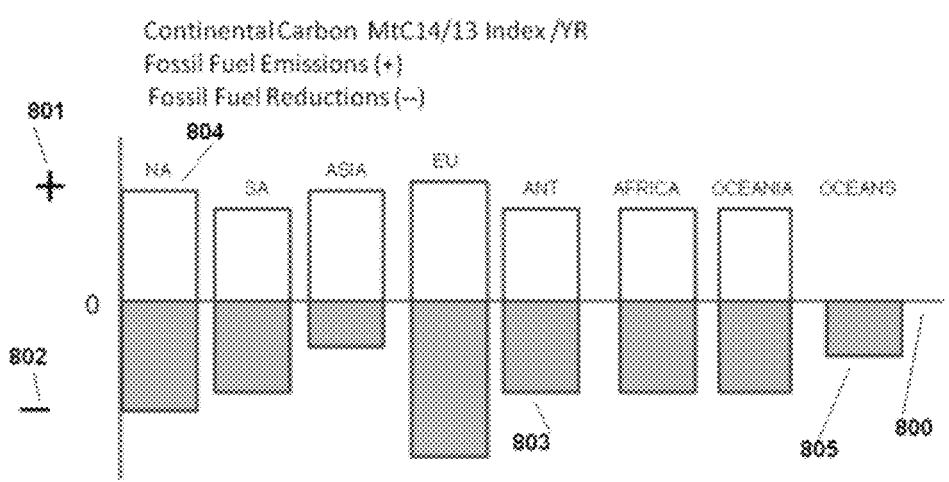
FIG. 8 illustrates a global sub-budget according to continental yearly budgets for carbon balance using 14C and 13C as for the global master index of FIG. 7.

Global Performance Indices Including a 14C Master Index for Fossil Fuel Emissions The tracking of performance relative to efforts to mitigate the GHG burden of the atmosphere is required to evaluate the effectiveness of reduction efforts but also to maintain a central and unequivocal performance Index for all GHG reduction activities across all genres of technologies and implementations. This is uniquely achievable in the case of fossil fuel emissions and fluxes derived from measurements of the rare form of carbon, the 14C isotopic composition of $CO_2$, an unequivocal marker of fossil fuel emissions. Several carbon indexes exist; however, all such indexes are based on underlying securities representing estimates only. For example, the Barclays Capital Global Carbon Index (BGCI) Total Return (www.barcap.com) is underlain by European Union Allowances (EUA's) and Certified Emissions Reductions (CER's), both of which are in turn based on estimations. The BGCI EUA's and CER's track the performance of the carbon credits associated with the EU Emissions Trading Scheme (EU Allowances) and the Kyoto Clean Development Mechanism (Certified Emission Reductions). However, both of these underlying assets, European Union Allowances (EUA) and Certified Reduction Credits (CER's) are based on estimates and do not involve actual measurement. Barclays Bank has also launched an index called the iPath Global Carbon Exchange Traded Note (ETN) (www.barcap.com) on the NYSE Arca stock exchange offering investors exposure to the global price of carbon. Barclays has also executed trades on a forward trade agreement with provisions for US emissions allowances associated with the Regional Greenhouse Gas Initiative (RGGI), the first mandatory carbon cap-and-trade program in the United States (www.barcap.com). It is to be noted again, that neither Barclays BGCI nor the RGGI employ actual measurements to determine carbon credits and resulting securitization. Thus, the uncertainties associated with carbon pricing may be compounded as carbon derivatives move from the initial estimation of carbon credits to many forms of carbon derivatives including futures, spots and swaps. The invention disclosed herein allows for all of the same market mechanisms described above but is based on metric tons carbon as fossil fuel or metric tons as biogenic carbon, represented by the $^{14}C$ and $^{13}C$ isotopes of $CO_2$ resulting from a system of systems measurement paradigm in which carbon credits are verified in time and space as described in U.S. patent application Ser. No. 12/698,460, entitled "System of System for Monitoring Greenhouse Gas Fluxes," the entire contents of which are incorporated herein by references in their entirety. Thus, a $^{14}C$ and $^{13}C$ based index comprising entities using the $^{14}C/^{13}C$ system of systems would be a valuable advancement in the monetization of carbon credits. An example of a global index based on the isotopic composition of $CO_2$ as described is illustrated in FIG. 7 with 0 net carbon line 700, positive or source emissions 701, negative or sequestered carbon units 702, carbon units based on $^{14}C$ or $^{13}C$ actual measurements 703, and in some cases the amount of carbon units that are based on estimation 704, with each bar representing the balance of global positive and negative emissions per year 705. The global budgets represented by the positive and negative bars of the index are comprised of partial budgets such as carbon budgets for each continent. Continental carbon budgets are illustrated in FIG. 8 with 0 net carbon line 800, positive or source emissions 801, negative or sequestered carbon units 802, carbon units based on $^{14}C$ or $^{13}C$ actual measurements 803, with each bar representing the balance of global positive and negative emissions for each continent per year or other time scale 705. The world's oceans are included and shown in this case as a net carbon sink 806 since the upper oceans hold more carbon than the atmosphere (FIG. 1). The ocean's capacity to absorb atmospheric $CO_2$ is related to surface water acidity which is altered by greater dissolution of $CO_2$ as $CO_2$ concentration increases (Thrathan & Agnew 2010). Thus, the oceans of the world are included with the planets continents given their large potential role in absorbing excess atmospheric $CO_2$. The continental budgets for carbon are in turn compiled from data for carbon budgets for sub-continental scale areas.

Sub-continental carbon budgets are easily operationalized in time and space provided a system of systems approach using $^{14}C$ detection in the atmosphere and resulting quantitative data for metric tons fossil or biogenic fuel is utilized as above. According to FIG. 9, sub-continental budgets are represented by each box (900) connected directly to the master carbon budget as described above and here represented by the box named Earth (901). Sub-continental budgets are shown in the case of North America (903) with subcomponent carbon budgets comprised of country (904), region/province (905), state (906), municipality (907) and town (908) carbon budgets. Such budgets could extend to finer scales as desired or needed. As a subcategory of the state (906), the state of Maine is shown (909). Thus, small scale or partial carbon budgets are aggregated to derive progressively higher level budgets up the global budget. This approach allows one to easily operationalize carbon budgets over diverse scales.

Figure 9:
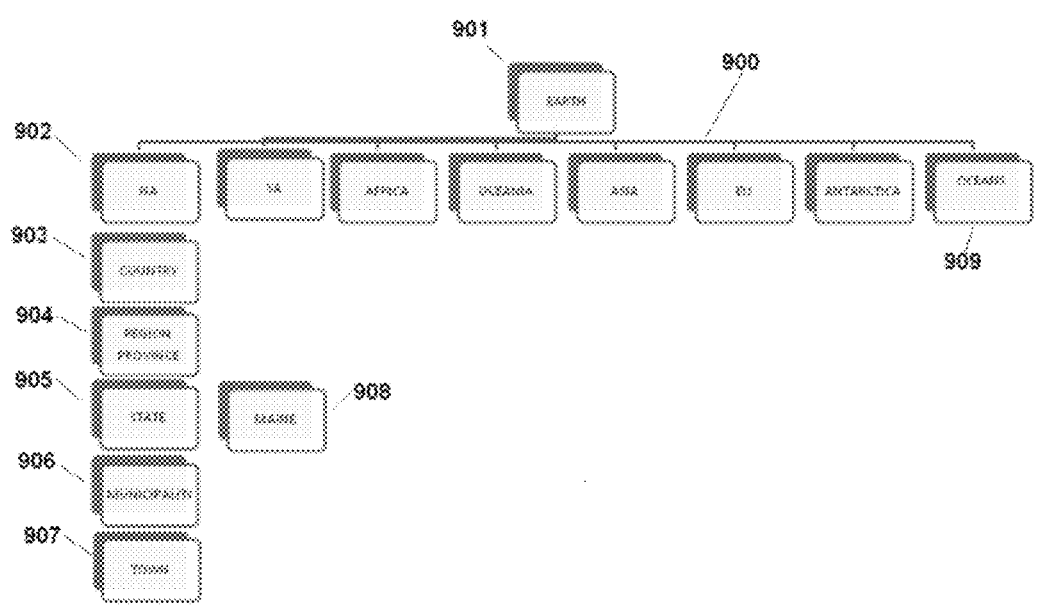
FIG. 9 shows a scheme for representation of sub-continental budgets including the oceans and showing a detail example for North America to the level of a town and further identifying the state of Maine.
Figure 10:
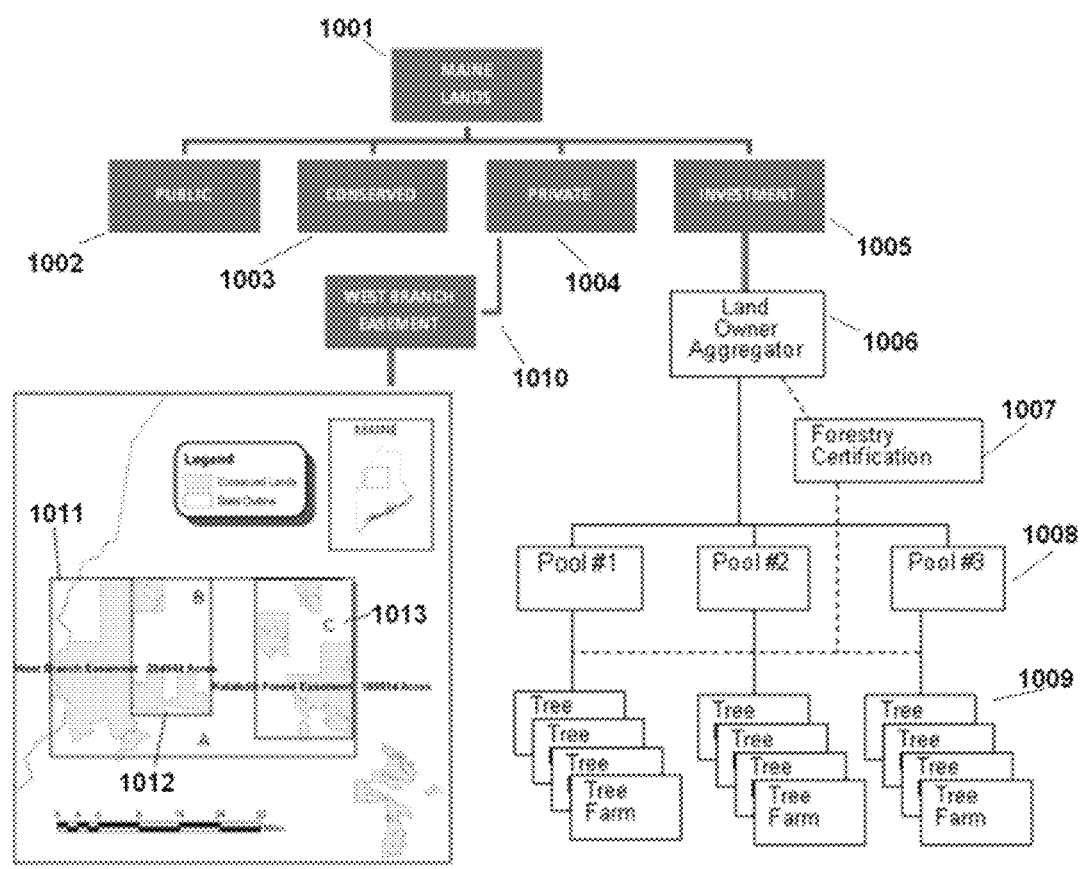
FIG. 10 illustrates the sub-state level carbon budgets for the state of Maine showing a parcel of land from the private land cover of Maine comprised of easements and also showing a hypothetical tree farm plantation organized by an aggregator.

Continuing with definition of sub-scale carbon budgets and referring to FIG. 10, the budget for the state of Maine with specific reference to Maine's forest land (1001) can be further sub-divided, for illustration purposes, into public (1002), conserved (1003), private (1004) and investment land (1005), among other categories. A further division, provided herein for illustration purposes only, shows a segment of private land (1004) mapped to define a specific land parcel (700) comprised further of parcels (701) and (702). Additionally, a segment of investment land (1005) is shown as managed by a land aggregator (1006) that is further described in terms of project level tree plantations comprised of three pools (1007). Thus, finer and finer scales of carbon budgeting can be identified down to the project level. In the above cases a quantitative systems of systems approach for the measurement of carbon isotopes and derivation of metric tons carbon as fossil or biogenic is required to provide a consistent additive property for higher order carbon budgets and carbon indexes as shown in FIGS. 7, 8 and 9. Thus, it is feasible to employ the disclosed invention as a closed end mechanism with universal measurement and derivation of metric tons carbon and employing universal indexes across all scales of the planet rendering quantitative details for carbon dynamics not attainable in any other way.

Market Mechanism for the Buying and Selling CEFFI's

Figure 11:
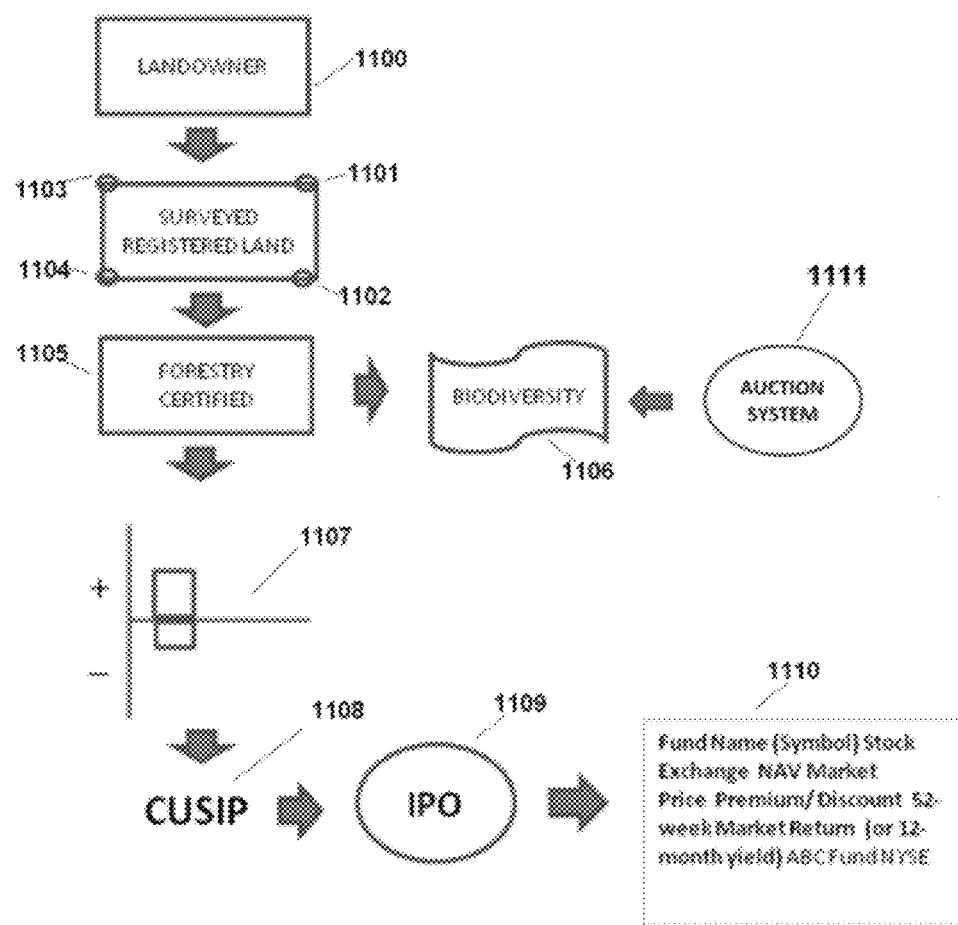
FIG. 11 shows a summarized securitization process for a parcel of land to be registered and monitored resulting in a yearly series of net carbon as source or sink and as available through a closed-end IPO and subsequent trading on secondary markets.

The implementation of a system of systems for CEFFI's resulting in reporting of metric tons of biogenic and fossil fuel derived $CO_2$ and subsequent incorporation of a financial mechanism requires a trading scheme by which investors acquire and then manage their carbon credits. According to FIG. 11, a landowner (1100) registers land in a forest based or similar registry (1101) which may then be certified as to species composition, age, etc., resulting in a certified and geographically defined (latitude, longitude (1102, 1103, 1104, 1105)) parcel (1101) available for carbon credit generation. Said parcel of land (1103) is then equipped with any number of isotopic measurement platforms (1106) which are then used to generate an immediate carbon balance baseline (1107) over a one year time period (1107), used here for illustration purposes only. In addition, within this parcel of certified forest areas of endangered species (e.g., plants/animal) are also identified. At the time of initiation of monitoring or at any other time thereafter as specified by the project plan and investment managers, a closed-end security can be created according to well known procedures in the securities industry and assigned a Committee on Uniform Securities Identification Procedures serial number (CUSIP) (1108) after which the fund may announce an IPO (1109) for the fund and raise cash by selling a fixed number of shares (1111) in accordance with the fund's GHG investment policy. The particular fund at this point may be comprised of any number of CEFFI's from any region on the planet. Subsequent to the IPO the fund's shares may be offered for sale in the secondary markets as described previously. The biodiversity auction system represented by 1112 is completed by employing an established auction system 1113 as is well known to those skilled in the art of online auction systems.

Asset Allocation Employing $CO_2e$ & Closed End Carbon Credits

Figure 12A:
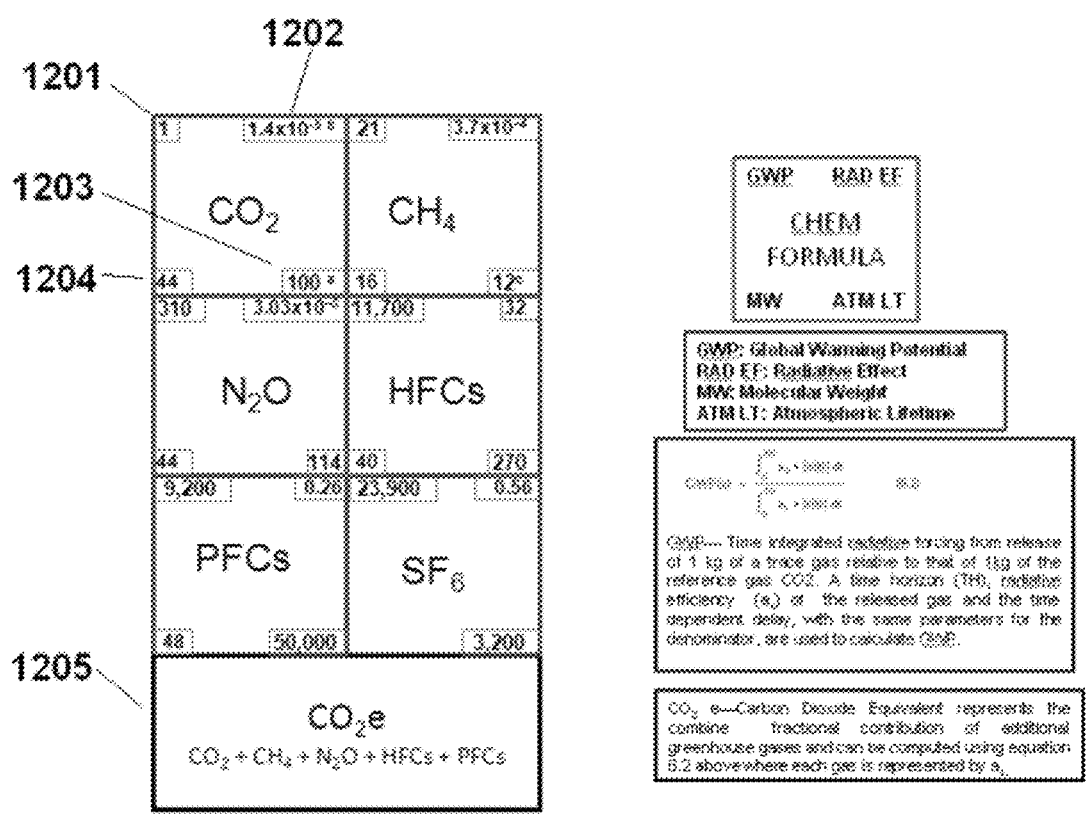
FIG. 12 illustrates periodic tables showing the main biogeochemical characteristics of each of the Kyoto GHGs (FIG. 12a) and for the three species of carbon that comprise the carbon cycle, carbon 12, 13 and 14 (FIG. 12b).

A method of asset allocation for CEFFI's (and other securities as applicable) to manage and reduce the concentrations in the atmosphere and to mitigate the impacts of climate change based on emissions profiles of CEFFI's is also disclosed. The segregation of forest based management processes based on the biogeochemical emissions profiles for $CO_2$, $CH_4$ and $N_2O$ or impacts on ecosystems allows project placement in a box of securities as described previously. Such "biosphere boxes" based on CEFFI's provides a flexible and sharply defined exposure to the trace gas patterns of forests of the world and to the companies that manage them. The term $CO_2e$ is used to express the global warming potential of the 6 identified greenhouse gases as shown in FIG. 12a with the global warming potential (GWP) (1201), the atmospheric lifetime (2102), the molecular weight (1203) and the radiative efficiency (1204) shown for each trace gas species. The lower box of FIG. 12a illustrates the term $CO_2e$ (1205) as representing a combination of any of the 6 GHGs. Thus, the disclosure of a closed-end concept for forest carbon also extends to the two additional and important trace gases of $CH_4$, $N_2O$. While these trace gases have isotopic compositions that also identify source components, their application as isotopic entities is not specifically addressed here, but it is emphasized that any gas with radioactive or stable isotopes may be treated in the same manner as disclosed here for the rare forms of carbon, $^{13}C$ and $^{14}C$.

Figure 12B:
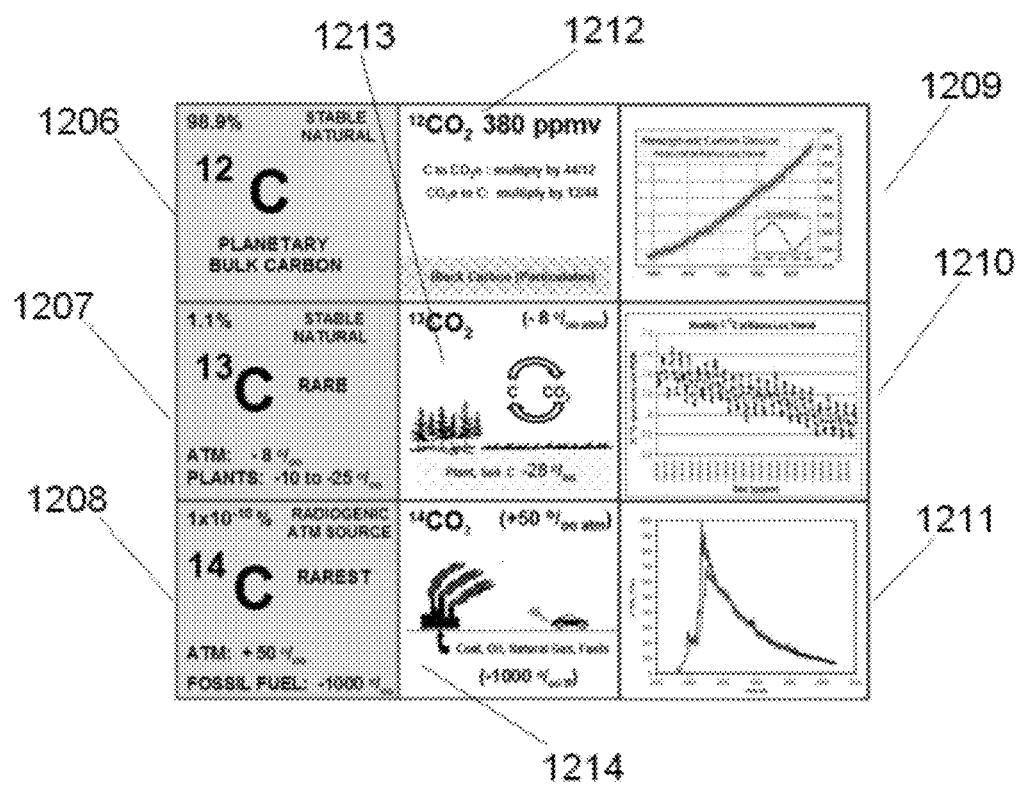

FIG. 12b illustrates a periodic table with basic information for 12C, the most abundant form of carbon (1206), 13C, a stable isotope of carbon (1207), and 14C a radiogenic form of carbon produced in the stratosphere (1208). Corresponding boxes for each form of carbon show concentration for 12C and a form of carbon, black carbon (1212), the atmospheric and soil concentration of 13C (1213) and the atmospheric background of enriched 14C relative to the 14C value for fossil fuels (1214). A CEFFI that also manages the emissions of $CH_4$ and $N_2O$ may be intrinsically more valuable than one that does not. The third column of FIG. 12b shows measurements for each carbon species in the atmosphere. The atmospheric records define the long-term trends for 14CO2, shown as increasing (1209), reflecting a yearly increase of combustion derived CO2, 13CO2, shown as decreasing (1210), and 14CO2, shown as decreasing (1211).

Although the invention disclosed emphasizes forests, any component of the biosphere may be treated in the same manner using a closed end fund approach, auction mechanism and $CO_2e$ project management. For example, agricultural activities may be managed to reduce $N_2O$ and $CH_4$ emissions. Grassland conservation tillage is also a candidate for reduced $N_2O$ and $CH_4$ emissions and could be included in a CEFFI along with agricultural projects. In any case, a CEFFI can be comprised of a variety of forest project types, as well as including other projects such as agriculture and grassland conservation, effectively diversifying the portfolio with respect to project risk related to carbon pricing, climate change, extreme weather events and general economic risk.

Figure 13:
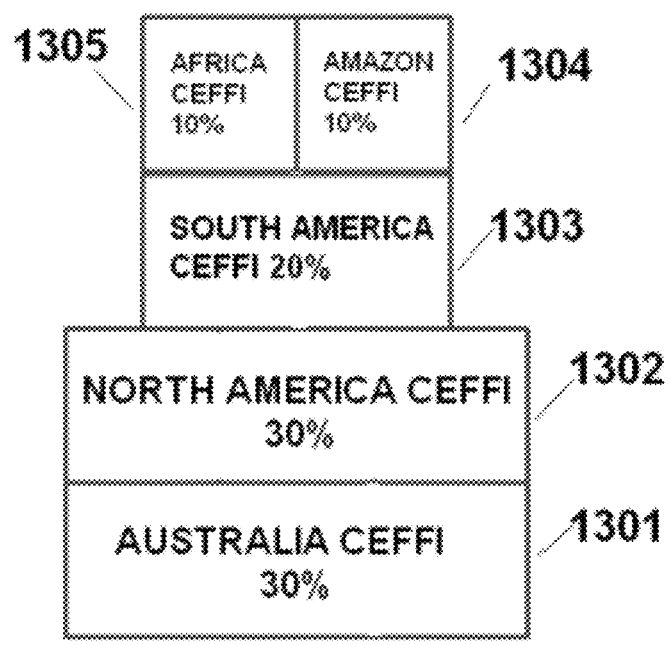
FIG. 13 shows a biosphere box with holdings of CEFFI securities originating from Australia, North America, South America, Africa and the Amazon.

A diversified CEFFI portfolio is shown in FIG. 13 with asset allocation for forest project holdings in both Australia (1301) North America (1302), South America (1303), the Amazon (1304) and Africa (1305). Accordingly, and recognizing existing categories in the securities and financial engineering disciplines, unique and novel CEFFI's may be created based on each CEFFI according to market capitalization, growth and value styles, sectors, and selections from international projects. Biosphere Boxes may also provide active strategic and tactical asset allocation strategies in an emerging GHG climate change economy to improve performance, control risk and integrate new perspectives on financial engineering for derivatives in the area of carbon trading. This approach can be extended to all compartments and ecologies of the biosphere including land, oceans, and atmospheric areas. Biosphere Boxes, as traded on secondary markets subsequent to the initial IPO will provide a liquid, globally accessible, focused and scientifically based approach to environmental investing that is more effective in transforming investor sentiment for changing the global environment than traditional environmental, social and sustainability funds and indexes.

Trace Gas Asset Allocation and Climate Mitigation Portfolio

Figure 14:
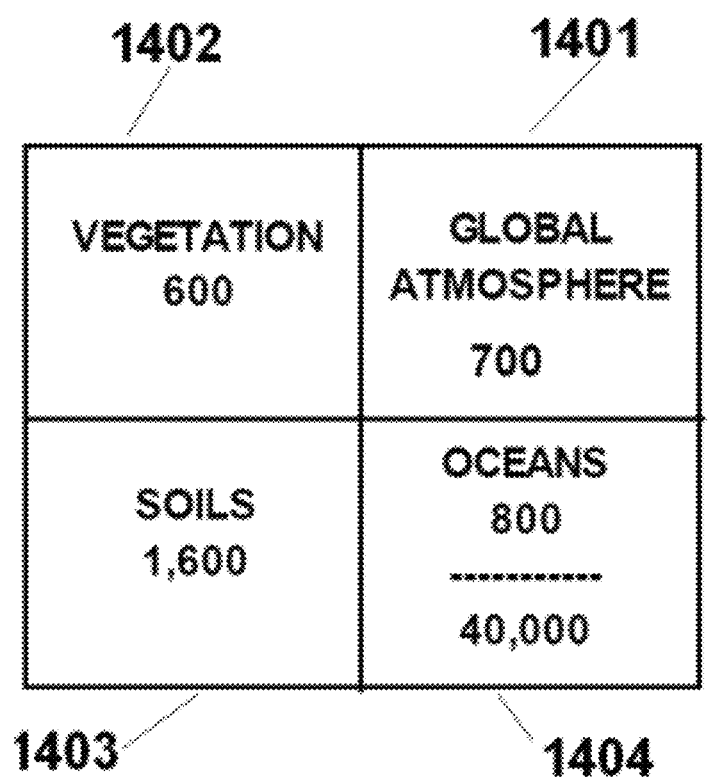
FIG. 14 shows the global carbon cycle in a biosphere box format with compartments and carbon reservoir sizes for vegetation, atmosphere, soils and the ocean (surface, deep).
Figure 16A:
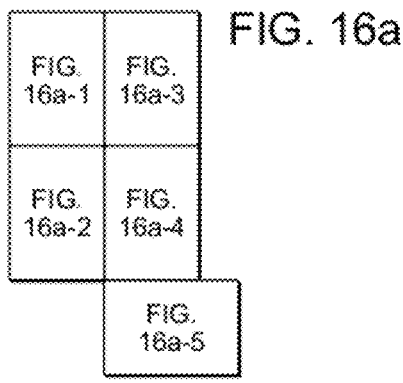
FIGS. 16 A and B show a summary of a comprehensive financial report for closed-end and related securities as disclosed herein. Global and continental indices for fossil fuel and biogenic carbon, performance charts, fees, style and diversification and return versus risk are shown as examples related to a range of securities for GHGs.
Figures 1, 16A:
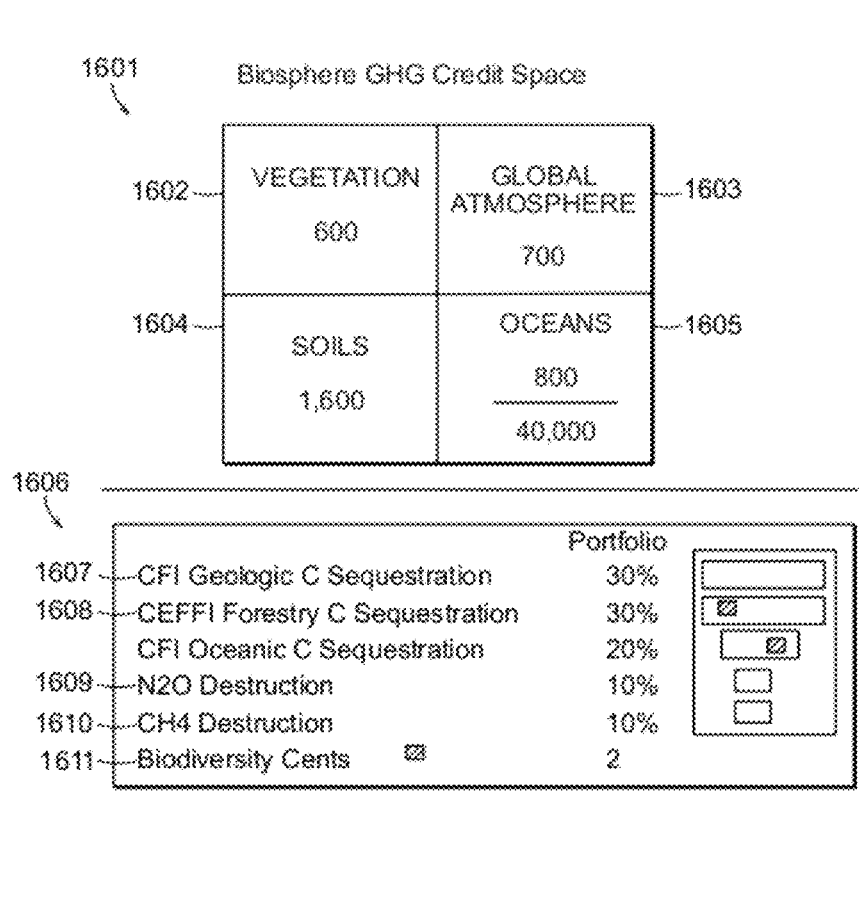
Figures 2, 16A:
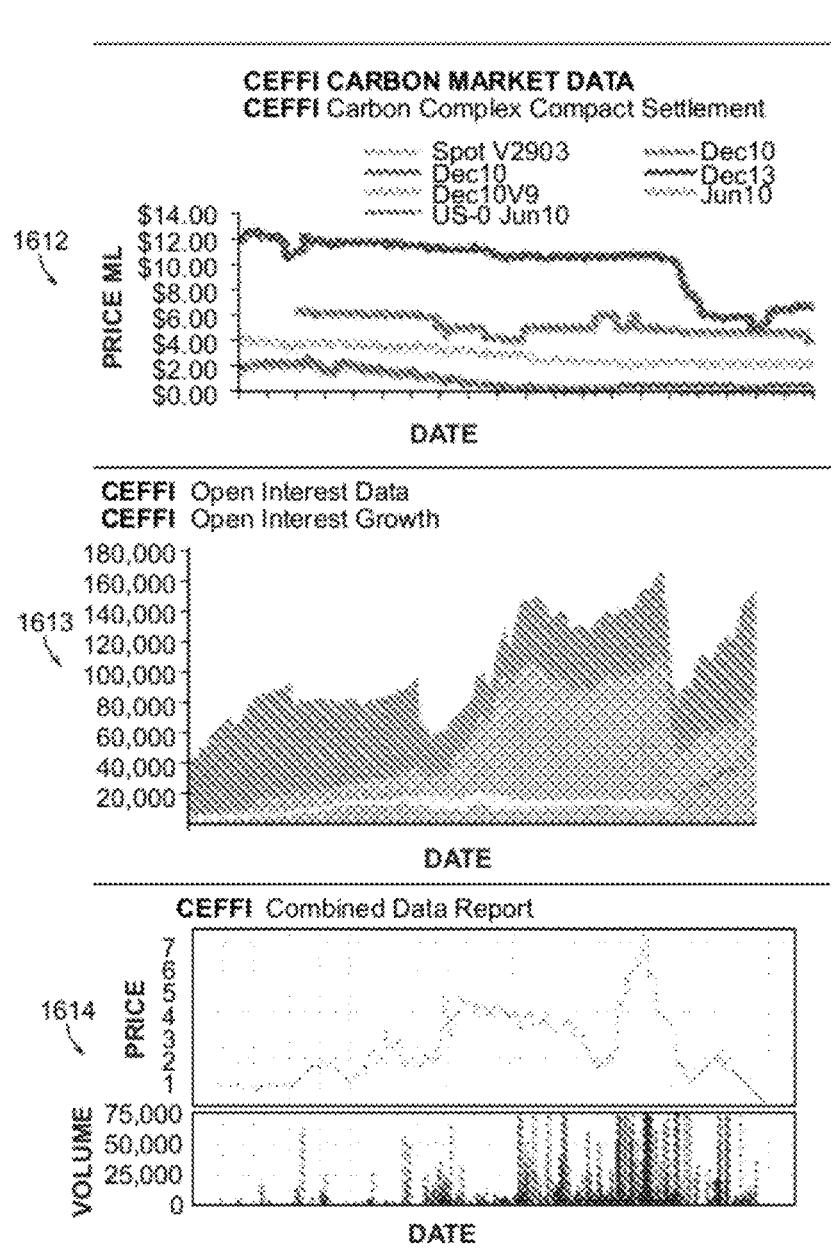
Figures 3, 16A:
Figures 4, 16A:
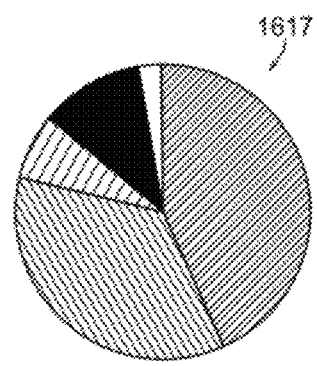
Figures 2, 16B:
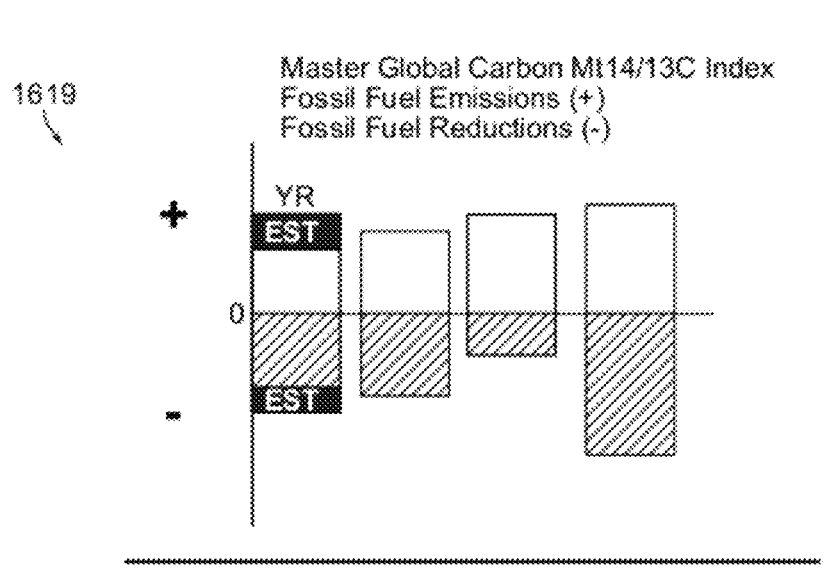
Figures 4, 16B:
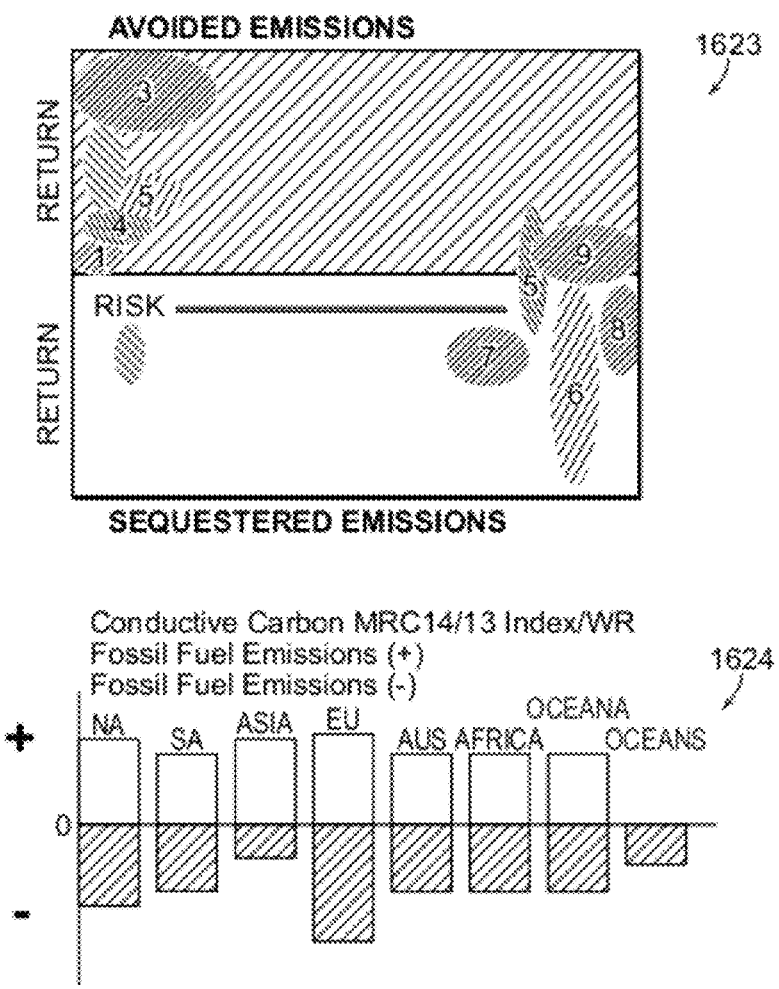

Carbon trading is significantly changing the securities pricing of companies that are actively and successfully engaged in addressing the issues of global warming and as disclosed herein with reference to CEFFI's. Thus, it would be highly desirable to provide an efficient market for any company that has positive impacts on the global environment, particularly control of GHG concentrations in the atmosphere, while maintaining favorable fiscal profiles and offering investors a focused and risk adjusted means to invest in such companies. In this way corporate entities that both provide positive impacts on the environment and on the economy will grow over time. Thus, the inventions primary goal embodied in the CEFFI structure but also as applied to any existing security is to shift economic growth away from historical patterns based on fossil-fuel, unregulated resource usage and ecosystem insensitive companies, industries and sectors to those that will propel both stewardship of the planet to a new era of economic growth. Such a transformation could also be viewed as a "reverse pioneer" effect in reference to the industrial revolution in which fossil fuel reserves were first tapped to fuel the rise of US economic prosperity and political power. A focus on companies that specifically manage (e.g., CEFFI) or intrinsically limit or avoid the six GHG's (CH4, N2O, CO2, SF6, PFCs, HFCs) would provide, in effect, a reverse pioneer pathway to a reduced CO2e emissions profile while preserving forests and the important flora and fauna that live in forests. A systematic and logical framework is required to allow markets to be guided in the appropriate direction of planetary stewardship. An understanding of the Earth's biosphere provides such a framework. FIG. 14 shows a schematic of an idealized Biosphere Box representing the global atmosphere (1401), vegetation (1402), soils (1403), and oceans (1404). FIG. 15 illustrates an example of atmospheric trace gases and broad areas of technology and commercial enterprise that either do not impact the trace gas budget of the atmosphere at all (e.g., zero emissions) (1501), (O—$CO_2$, O—$N_2O$, O—$CH_4$) or that reduce the concentrations of GHG's (R—$CO_2$, R—$N_2O$, R—$CH_4$) (1502). In each category of trace gas, such as $CO_2$, $N_2O$ or $CH_4$, underlying technologies that reflect either zero impact or a reduced impact on the atmospheric burden of trace gases are listed. Note that forests are included under each reduced trace gas category and could consist of CEFI's as previously disclosed herein. Companies that reduce the concentrations of trace gases are categorized according to source terms for each trace gas. All companies could be grouped in boxes according to geographic location, capitalization, style and other factors. The combined Global Atmosphere Box would allow an investor to select companies that have zero or reduced impacts on the GHG budget of the global atmosphere and manage risk as well as exposure to non-market factors.

FIG. 16 illustrates a summary report representing a variety of components for reporting of the previously described closed-end security with elements of biodiversity auction and trace gas asset allocation. FIG. 16 also shows how one would create a total Biosphere Box allocation model from which to build a portfolio. The core biosphere box concept has already been described, however, final selection of a box or combinations of boxes will depend on many factors including style and sector as well as market fundamentals in any given industry. Thus, the invention discloses a unique method to diversity a portfolio comprised of Biosphere Boxes in which each box may represent a variety of CEFFI's with a variety of projects. Referring to FIG. 16, (1601) shows the overall biosphere box and here incorporated as (1602) representing carbon residing in global vegetation, (1603) representing carbon in the global atmosphere, (1604) representing the carbon residing in global soils and (1605) representing the upper oceans and deep oceans carbon stores. Again referring to FIG. 16, (1606) shows the composite biosphere box with CFI (1607), CEFFI (1608), $N_2O$ destruction (1609), $CH_4$ destruction (1610) and biodiversity auction credits (1611). Following FIG. 16 further, (1612) shows an example of composite reporting of price of credits as held in the biosphere box (1606) graphed as price of carbon per metric tone, for example, versus time scale covering any number of periods over which the carbon credits were in the portfolio. Further, (1613) shows open interest in one or more of the carbon credits again according to time period of interest, while (1614) shows a chart of performance for one or more carbon credit securities held in the biosphere box (1606).

Previously described periodic tables for the forms of carbon (here referred to as 1615; see also FIG. 12b) and for the 6 Kyoto greenhouse gases (here referred to as 1616; see also FIG. 12a) may also be part of the reporting summary for the biosphere box components and as customary for description and reporting of typical securities as well known to those in the art of reporting summary data for such typical securities. Again referring to FIG. 16, (1617) could represent a broader overview of individual's securities holdings to include stocks, bonds and the closed-end securities disclosed herein, and asset allocation according to trace gas features as described in FIG. 15, in this case typically shown as a pie-chart. Following the components comprising the reporting summary, FIG. 16 also provides a description of the geographical origins (1618) of the biosphere box holdings, as well as a comparison of holdings compared to a global standard index (1619) based on fossil fuel released $CO_2$ (derived from 14C) and biogenic $CO_2$ (derived from 13C).

Information regarding fees and expenses are also provided (1620) with a simple listing of the sectors and types represented in the biosphere box composite security. FIG. 16 may also contain summary descriptions of style and diversification (1621) of the holdings in the biosphere box representing valuation (e.g., value, core, growth) and size of project (e.g., small, medium and large), as well as pricing sensitivity and carbon credit quality (1622). The features represented in (1621) and (1622) are well known to those skilled in the art of securities definition, however, the components of the summary report disclosed herein is not typical for carbon credit holdings. Referring again to FIG. 16, a chart representing the relationship between risk and return for any given type of GHG credit (1623) can be readily constructed using a reporting format that places all avoided emissions in one graphic space (i.e., gases not emitted from source such as the use of nuclear, solar and hydro power) shown here in the upper panel of (1623), and for carbon credits that are based on removing a GHG from the atmosphere subsequent to deposition (i.e., sequestered forest carbon, chemically captured carbon, destruction of $CH_4$) shown here as the lower graphic space of (1623). Again referring to FIG. 16, a summary of total carbon emissions activity according to a continental scale and index can be constructed (1624) based on 14C and 13C as described for component (1619) previously. Thus, GHG credits of all types can be effectively summarized for individuals showing fundamental aspects of securities; while such aspects of securities are typical, none have been provided in a comprehensive manner for GHG credits.

Under some embodiments, a method to monetize carbon as dynamically resident in any compartment of the biosphere (e.g., above and below ground biomass) is provided. The disclosed invention utilizes the concept of a closed-end fund structure and mechanisms, well known to those skilled in the art of financial securities, combined with the biological basis of forest carbon fixation, also known to those skilled in the art of forest ecology. However, no such combination of methods and mechanisms exist for GHG securities. Currently, closed-end funds are used to trade stocks, bonds and other instruments and represent one of the several types of investment vehicles that are used by investors and shareholders to invest capital. For example, while some forest holdings may be held in some types of existing non closed end structures (e.g., TIMOs, REITS) the purpose in these cases is to manage the funds for maximum returns and are not linked to forest ecology, and are otherwise inappropriate for typical investors. TIMO's, as discussed above are not publicly traded and REIT's are required to distribute 90% of income each year, precluding redemption at strategic forest biological time periods of much greater than one year. Under some embodiments, the current disclosure provides a scale and time appropriate measurement capability or MVA approach as described previously for any closed-end fund as proposed for example, forest carbon, here referred to as a closed end forest financial instrument (CEFFI). Measurements may consist of arrayed carbon dioxide analyzers for concentration and isotopic species covering the geographic boundary coordinates of the CEFFI. The measurement feature is required to reduce the uncertainty of the derived carbon flux term and thus reduce the uncertainty of carbon pricing. Reduction in the uncertainty of carbon pricing is a requirement for a credible and sustainable carbon market. The combination of diverse forest carbon projects from any point on the planet can be combined within a closed-end box thus spreading out pricing and asset value variance over a number of projects. The auction component as herein described has not been widely used for the auction of verified carbon credits nor as a method to reduce deforestation and biodiversity related to spatially defined areas of land. While available auction software is widely available (e.g., eBay), such methods have not been linked mechanistically to forest preservation, carbon trading and biodiversity preservation.

Under some embodiments, the present disclosure provides methods and system that may comprise:

1) A closed-end fund structure with typical features of such a structure including an initial public offering (IPO) and as typically utilized in the mutual fund industry. Subsequent to an IPO shares are listed on exchanges, traded daily at discount or premium according to investor demand and are held till the fund is opened for investor returns/losses to be realized.
2) A finite number of acres or other defined area by land survey, aerial survey or of any other means of mapping that provide latitude & longitude and altitude for each parcel or contiguous parcels and that represent a fixed number of "carbon units" to be held in the closed-end fund structure, defined as a Closed End Forest Financial Instrument (CEFFI). Such geographical data are to be consistent with legal descriptions of said properties and which are enforceable according to the said location(s). Thus, a double count, fraud or other error of addition or subtraction cannot occur in the context of carbon accounting.
3) An initial period of the CEFFI or initial public offering (IPO) in which investors purchase shares according to a defined period of time and according to a defined forest carbon management program, for shares to be held and matched to a specific number of growing cycle's representative of the soil and above ground biomass (types of trees, cover, crops, plantations, etc.). Such holding times can range from one year to decades to centuries, during which time all underlying carbon units or shares are not traded or sold, except as provided for in secondary markets. The CEFFI operations may shift to include new activities such as changing management of the CEFFIs to increase carbon sequestration or to selectively harvest wood for long lived wood products. While the fund may be opened for redemption and trading on a five or ten year schedule, the long term interval of the CEFFI can be considered permanent and defined as a period of any length including a 100 year interval of CEFFI management, thus, the net carbon accumulated over 100 years may also serve as the base against which the interval carbon accumulations may be compared. Such a long term interval would also allow for periods of forests acting as sources provided that the net 100 year cumulative carbon sequestered is negative or neutral to the atmosphere.
4) An automated, on-line retail auction process in which buyers bid on select parcels in identified CEFFIs representing parcels that contain specific, real, documented rare or endangered species and/or habitats of such species, that are to be held within the CEFFI offering a non-Kyoto mechanism to preserve biosphere features of economic and cultural value.
5) Defined holding periods in which successful bidders/buyers hold the CEFFI shares in the closed-end structure until it is matured according to a set schedule and, as in closed-end funds, a positive or negative distribution to shareholders is made at the time of fund redemption and according to the fund prospectus.
6) In all cases the carbon flux of the CEFFIs on an annual basis are monitored, verified and accounted (MVA) for to obtain data for above ground and below ground carbon dynamics resulting in verified annual net carbon quantities. Such quantities can then be monetized by selling as carbon credits to entities that have emitted beyond established or regulated caps or in secondary markets and exchanges.
7) Parcels within the CEFFI may have variable quality and thus some areas may be more desirable with respect to carbon sequestration, species protection, habitat protection, ecosystem function and/or other traits than others and with respect to take-up of carbon than others and creates the basis for an auction process referring to defined CEFFIs (size and shape specific) and the ability to auction within a given CEFFI either in conjunction with the IPO or at a later date, and either bid upon by the shareholder of the specific CEFFI or other shareholder.
8) Revenue from auction or selling of one or more CEFFI shares based on a given parcel of land may be used to fund monitoring of the parcel and to purchase like parcels of contiguous land in other areas, thus preventing deforestation and controlling leakage. The CEFFI approach could be utilized directly by indigenous peoples to preserve vast tracts of land and forest that are not currently included in the Kyoto mechanism and thus avoid deforestation while at the same time preserving cultural and ecological biodiversity.
9) CEFFIs are employed with rigorous MVA programs to establish credible and accurate pricing for carbon credits derived from forest carbon.
10) An MVA defined, globally consistent, baseline. Such baseline is established and maintained by the rigorous use of common, linked reference and standard gases applied to each analytical instrument and to all instruments collectively through time and space. The establishment of a cross and inter-comparison baseline results in monetary equivalency of carbon regardless of measurement location.

11) Global and sub-global baselines and indices against which all GHGs can be compared. In the case of carbon, fossil fuel derived CO2 may be inferred from measurements of 14C of CO2 under a variety of settings spanning local to global scales; the same can be applied to 13C rendering data for biogenic carbon cycling. Such indices provide the means to create monetary equivalence for GHG credits across all locations and scales from local to global.

12) An asset allocation method that is based on selecting securities for a portfolio strictly on the trace gas emissions profile for a given company in a given sector. In this method companies and sectors that produce no GHGs, such as nuclear, solar and other non-fossil based energy sources.

The CEFFI is a unique ecological financial security that provides for the rigorous control carbon within the securities industry as regards to shareholder actions and that is matched to the biological determinants of forest carbon pools and their flux between the atmosphere, above ground and below ground carbon pools.

EXAMPLES

Example 1

Use of MVA and CEFFI

In this example results described earlier for the Harvard Forest, Petersham, MA (Barford et al., 2007) are used to illustrate a combined MVA program and a CEFFI, as disclosed herein, for trading forest carbon and value added auction mechanism to preserve biodiversity. The Harvard Forest carbon flux measurement system (e.g., Wofsy et al., 1993; Goulden et al., 1996; Barford et al., 2007; Barford et al., 2007), in this example, represents an aspect of an MVA system of systems as represented by a single instrument tower.

It is to be understood that a system of systems approach as described in U.S. patent application Ser. No. 12/698,460, entitled "System of System for Monitoring Greenhouse Gas Fluxes," discloses a preferred embodiment employing one for more towers. However, in this case we take a single tower to represent a defined geographic footprint of 3 hectares and as such the land covered can be defined by latitude and longitude of such land. Such land designations would be identified within the CEFFI documentation and such carbon flux measurement system would be in place prior to or shortly thereafter the initiation of CEFFI, according to the CEFFI prospectus. Additionally, in this case the Harvard Forest CEFFI (HF CEFFI) total fund period is set, for illustration purposes, at 100 years with intervals of redemption at 5, 10, 20, 50 and 100 years. The initiation of the defined HF CEFFI is signaled by an initial public offering (IPO) of the HF CEFFI and as such investors become shareholders in designated defined subparcels within the HC CEFFI by purchasing IPO shares in a typical process of acquiring such securities. In this case we shall designate that the units offered at the IPO of the HF CEFFI consist of 3 hectares of land, each with a longitude and latitude designation (e.g., referring to FIG. 4) and as such only 3 shareholders may participate in this example of the HF CEFFI. We take for example that each hectare of land within the HF CEFFI is offered at a price of $10 per hectare of land resulting in $30 total funds at which time the IPO is completed and the HF CEFFI is essentially closed for a period as specified—in this case for the initial 5 year period. At the point when the IPO transactions are finalized and the CEFFI is "closed," the shares are converted to stocks and listed on an exchange for trading. Shareholders and others may trade their shares on secondary markets as desired and as typical for a conventional closed-end fund for securities selling in secondary markets. During the period of closure, the net asset value or NAV of each share may fluctuate according to demand for carbon credits. If the demand for carbon credits is high, investors may choose to purchase shares at a premium (i.e., higher than the NAV) on the assumption that by the first redemption period the price of each share representing a carbon credit will be higher than the purchase price. Shares, likewise may also be purchased at a discount, perhaps in relation to a major storm that could interrupt carbon sequestration as observed in the Harvard Forest discussion previously (e.g., Barford et al., 2007).

Figure 6:
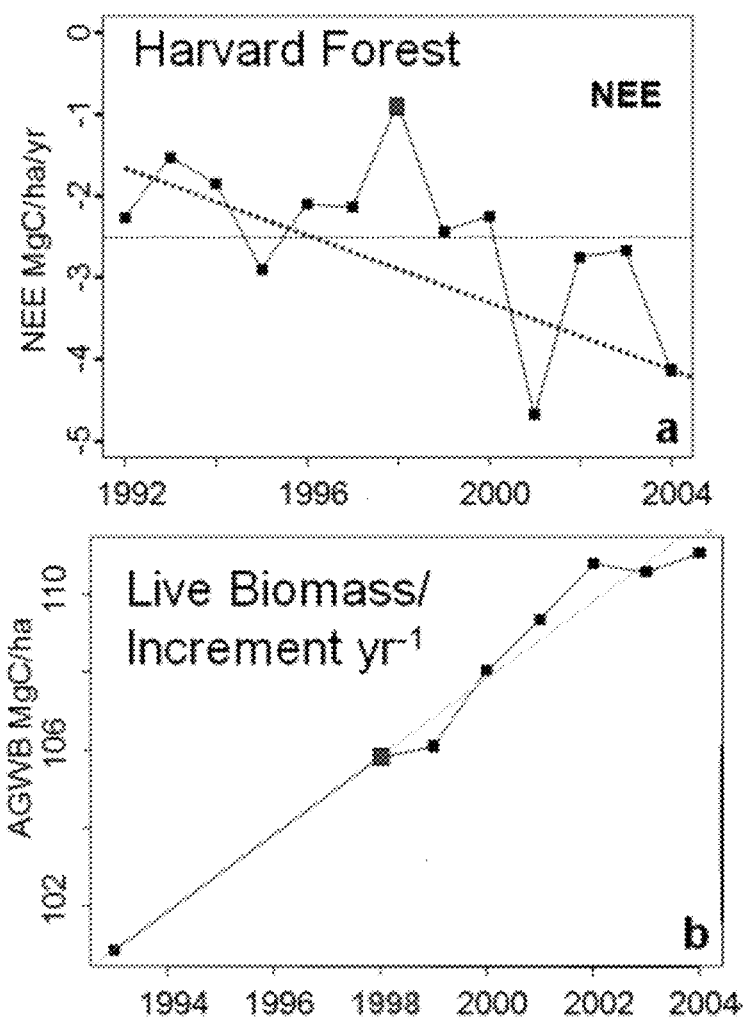
FIG. 6a illustrates the yearly net ecosystem exchange (NEE) for an experimental forest area located in Petersham, MA, derived from actual measurements of daily carbon flux using the eddy covariance approach.
FIG. 6b shows that the carbon sequestration can be identified as an increase in above ground biomass using biometric approaches; however, the sole use of biometric, traditional forestry could not identify and quantify the ecological year dynamic flux of forest carbon.

Continuing with the example, the HF CEFFI, and referring to the data illustrated in FIG. 6, we can see that the first five ecological years (e.g., 1992 to 1997) resulted in a net sequestration of 3.1 MgC/hectare/year or, considering that the CEFFI contains 3 hectares amounts to 9.3 MgC, for the first five year period of the HF CEFFI. At this point, the shareholders may redeem their shares. In this example, if 1 MgC is currently priced at $20 per MgC then the proceeds for sale of the shares equal $186 or $62 per shareholder. A fee of 10% per year of the initial fund value, chosen for illustration purposes, as levied to cover the costs of monitoring and administration amounts to $5 for the five year period which then nets each shareholder $57. In this case, considering that each shareholder invested $10 per hectare initially represents a net (of fees) gain of $47 or approximately a 456% return on the initial investment (5 years; 40.9% annualized return). As this illustration shows, the individual net carbon sequestered for each ecological year is required to provide a credible buy/sell market. The carbon units redeemed at the five ecological year mark would be used as carbon credits and sold on voluntary (e.g., CCX) or regulated greenhouse gas exchanges (e.g., EU ETS).

Subsequent to settling all shareholder matters for the first five year period, the HF CEFFI is again open to investors and, as before, 3 hectares are offered at $15, used here strictly for illustration representing a total of $45 in the HF CEFFI. Over the next five years, 1998 to 2002, the HF sequestered 7.4 MgC/hectare representing a total for the three hectares in the HF CEFFI of 22.2 MgC. In this further example, if the price of carbon at year 10 was $25 per MgC and all three shareholders redeemed their shares at that price the total proceeds would be $555 or $185 per shareholder. Again, applying a fee of 10% per year of the initial carbon price (i.e., $7.50) here for illustration purposes only, the net return for each shareholder would be $177.50 representing a net gain of $162.50 and approximately 980% return on the original investment (5 years; 61% annualized return). The examples provided above are strictly for illustration purposes; the actual pricing of carbon and the sequestration rate of carbon in other forests and under differing conditions could be substantially different.

It is easily understood to one skilled in the art that the above example can be applied to any forest, biome or biosphere entity with land cover, anywhere on the Earth and that the invention as disclosed is not limited in any way by the example provided.

Example 2

Auction Mechanism for Biodiversity Preservation

Referring to FIG. 5 and specifically endangered plants 507 and 508 and endangered animal 509, an auction such as that provided by E-bay or other auction is initiated by listing the specifics offered. In this case, a description of the CEFFI and prospectus are provided as well as evidence that such plants and animals exist in the geographically defined areas provided for in the CEFFI or composite of CEFFI's. Such evidence could exist as photos or videos that may be posted on the internet at any number of sites and which may be independently verified by online encyclopedias such as the Encyclopedia of Life (www.eol.org) that are independent of the CEFFI project. As such an auction item is guaranteed to be valid by demand for in situ inspection at any time and further that a set of actions will be taken to further preserve the endangered species that could include habitat protection (e.g., reducing or eliminating deforestation in the area(s) of the endangered species), habitat surveillance, habitat restoration or other actions that will further protect the endangered species. The item plus accompanying descriptions are placed on an auction site and an opening bid is entered as well as a time for conclusion of the auction. At the termination of the auction the highest bidder is notified and a certificate and other information are provided by internet or by mail with the specifics of the auction item within the context of the CEFFI. The auctioned item may also have a time period during which amelioration of the endangered status is accomplished and no further auctions are required, or, a set period of time, perhaps in synchronization with the CEFFI ecological year redemptions or other period of relevance, after which a new auction is offered. The process continues until the endangered species is no longer endangered. The funds from the auction are paid to the CEFFI and the management of the CEFFI provides funds to execute the actions identified in the auction description. As part of the CEFFI the use of funds and reporting of such funds will be required according to applicable securities and legal requirements.

Example 3

A State CEFFI Initiative, Leakage and Permanence

The state of Maine has approximately 20 million acres of forest with some 9 million acres under private ownership and approximately 2 million acres under various easements. Referring to FIG. 7, an inset map of the state of Maine is shown with locations of two easements, the West Branch Easement consisting of 284,944 acres and a Katandin Easement consisting of 189,514 acres. A geographical boundary A (700) encompasses both easements B (701) and C (702). The boundary A with defined latitude, longitude and altitude, is set as an example of how land ownership in Maine involving the current easements, B and C, can be managed to reduce leakage at the project scale. Such management would consist of land aggregation as an easement or purchase of the land by the state of Maine for conservation purposes. An MVA, CEFFI could be defined as the area represented by the large boundary A with MVA deployment within and along the perimeters of the two easements leaving land between the easements and contiguous to the easements open for aggregation. Thus, the CEFFI approach disclosed herein provides for an incremental land aggregation approach that treats leakage at the project scale. In each case for the existing easements ecological year net carbon sequestration is required and as such funds from the IPO may be utilized to acquire more land easements, specifically the land between the two existing easements. As parcels are aggregated along contiguous borders eventually the whole of boundary A could be acquired or the majority of it could be acquired. In patches of land that are not acquired but are within the network of MVA systems, one may use such MVA data as provisional data for ecological year carbon sequestration as described previously referring to FIG. 4. The purchase of easements through aggregation is carried out with appropriate legal documentation and proceeds in similar fashion to all such legal transactions. According to the management plan and prospectus for the Maine CEFFIs such contiguous land may be targeted for aggregation and carbon sequestration management thus addressing leakage at the project level and ultimately at the state level according to state mandates.

Figure 17:
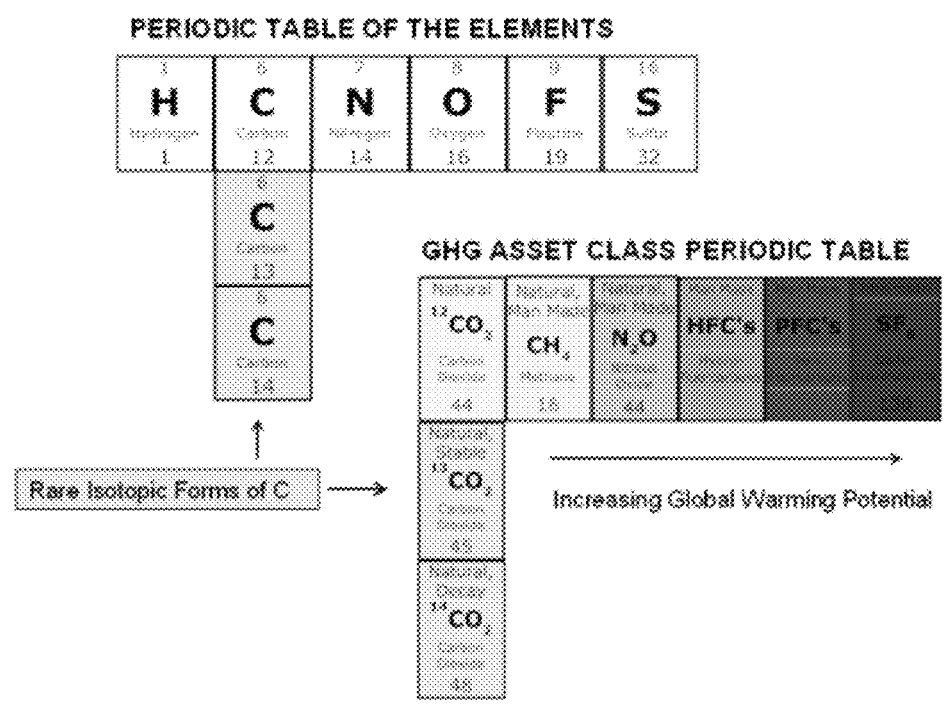
FIG. 17 illustrates periodic tables for the important greenhouse gases and defines each Kyoto greenhouse gas an asset class with increasing global warming potential.

FIG. 17 illustrates periodic tables for the important greenhouse gases and defines each Kyoto greenhouse gas an asset class with increasing global warming potential. The upper periodic table shows the basic building blocks of elements that make up the Kyoto greenhouse gases, namely, hydrogen, carbon, nitrogen, oxygen, fluorine and sulfur. The element of carbon has two rare isotopic forms, 13C and 14C, as shown. The corresponding rare forms of carbon, shown by the lower link, are incorporated in carbon dioxide (CO2) and offer powerful constraints on quantification of carbon from biogenic carbon cycling represented by 13CO2 and from anthropogenic carbon represented by 14CO2. The lower periodic table shows the Kyoto greenhouse gases carbon dioxide (CO2 and its isotopes, 13CO2 and 14CO2), methane (CH4), nitrous oxide (N2O), hydrofluorocarbons (HFCs); (PFCs); (HFC's), perfluorocarbons (PFC's) and sulfur hexafluoride (SF6). Each greenhouse gas can be represented as an "asset class". An asset class in this case is defined as a category of investment as related to greenhouse gases. Typical asset classes familiar to investors are equities, stocks, bonds, real estate, etc. Asset classes for the greenhouse gases represent fundamental categories of investment opportunities associated with each gas. The investment opportunities would be related to technology or businesses that reduce the emissions of each greenhouse gas. Designating each greenhouse gas as a distinct asset class provides a way for investors to embrace reduction technologies for each gas with the potential to create viable markets.

FIG. 18 illustrates the Kyoto greenhouse gases arranged according to their global warming potential, atmospheric lifetime and market capitalization. The market capitalization shown for each gas is an estimate based on dollar volume transactions (2009 data) but illustrates the importance of tracking GHG reduction efforts in terms of a single gas (e.g., each gas as an asset class as described in FIG. 17) as related to fundamental properties of each gas—namely, it's persistence and concentration in the atmosphere and its global warming potential. It is not surprising that CO2 represents the GHG of the highest reduction efforts (e.g., capitalization) given that anthropogenic CO2 is the main perturbation to the atmosphere. CH4 occupies the next highest market capitalization with the remaining gases with lower overall emphasis to date. This method of evaluating the relationship between global warming potential, atmospheric lifetime and market capitalization provides for a classic and understandable investment perspective regarding GHG markets.

Figure 19:
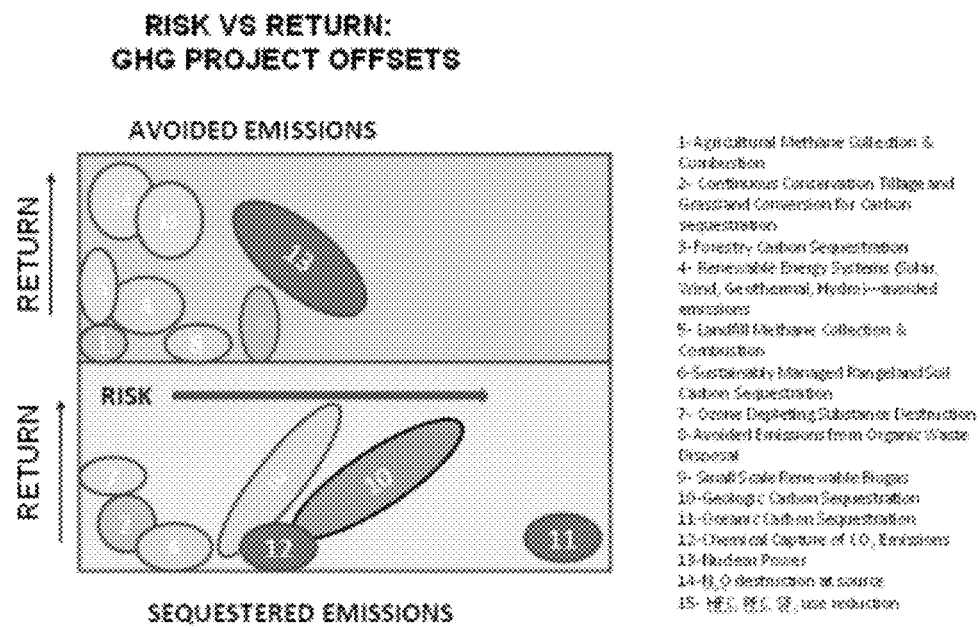
FIG. 19 shows an arrangement of typical GHG reduction emissions projects according to their physical nature, investment risk and investment reward.
Figure 20:
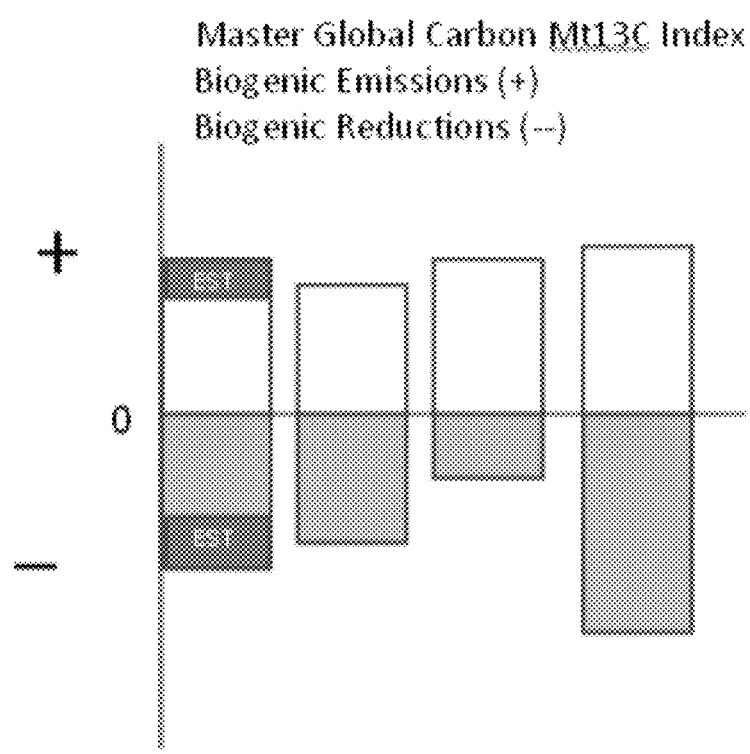
FIG. 20 illustrates a global master index of carbon based on 13C methodology to determine biogenic carbon emissions both as avoided (i.e., were never produced due to an avoidance process) and sequestered emissions (i.e., fossil fuel CO2 was produced but then captured and sequestered by a variety of approaches). The same data could be reported to cover biogenic carbon emissions on a global scale.

FIG. 19 shows an arrangement of typical GHG reduction emissions projects according to their physical nature, investment risk and investment reward. The upper panel shows methods for which GHG's are never emitted to the atmosphere and are thus "avoided"; the lower panel shows methods for which GHG's are pulled out of the atmosphere and are thus "sequestered." Project types are listed by number according to the legend shown. Return versus risk placement illustrates the potential to further adapt typical investment approaches for GHG projects allowing investors to evaluate portfolio risk in an understandable way.

Figure 21:
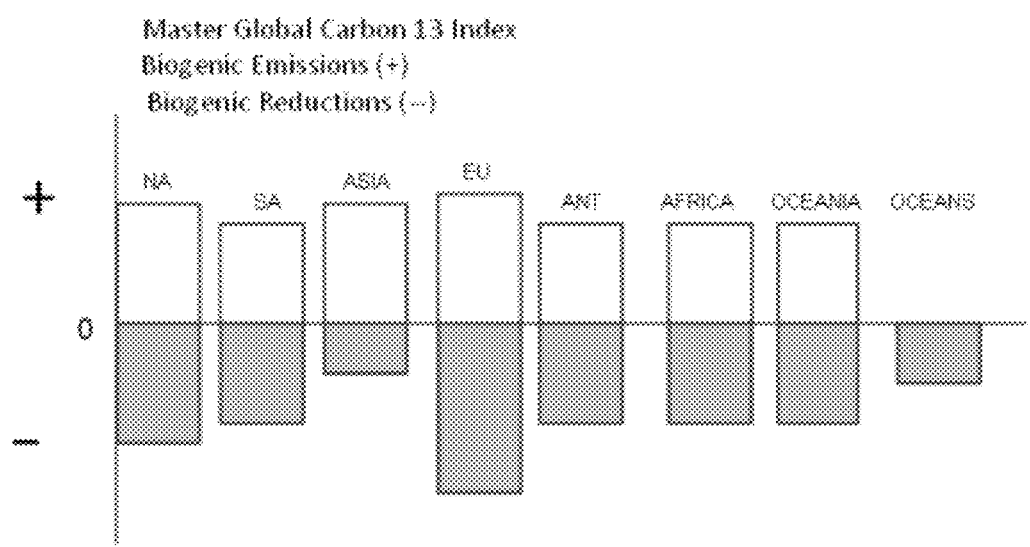
FIG. 21 illustrates a global sub-budget according to continental yearly budgets for carbon balance using 13C as for the global master index of FIG. 20.

An example of a global index based on the isotopic composition of $CO_2$ as described is illustrated in FIG. 21 with zero net carbon line, positive or source emissions, negative or sequestered carbon units, carbon units based on $^{13}C$ actual measurements, and in some cases the amount of carbon units that are based on estimation, with each bar representing the balance of global positive and negative emissions per year. The global budgets represented by the positive and negative bars of the index are comprised of partial budgets such as carbon budgets for each continent.

Continental carbon budgets are illustrated in FIG. 21 with zero net carbon line, positive or source emissions, negative or sequestered carbon units, carbon units based on $^{13}C$ actual measurements, with each bar representing the balance of global positive and negative emissions for each continent per year or other time scale. The world's oceans are included and shown in this case as a net carbon sink since the upper oceans hold more carbon than the atmosphere (FIG. 1). The ocean's capacity to absorb atmospheric $CO_2$ is related to surface water acidity which is altered by greater dissolution of $CO_2$ as $CO_2$ concentration increases (Thrathan & Agnew 2010). Thus, the oceans of the world are included with the planets continents given their large potential role in absorbing excess atmospheric $CO_2$. The continental budgets for carbon are in turn compiled from data for carbon budgets for sub-continental scale areas.

FIGS. 22 to 28 describe embodiments of additional operating and methodological components of the system of systems including instrumentation arrays, calibration and inter-calibration of instruments, global references, system architecture and data transmission and methods employing models to produce market ready aggregated data in the context of partial carbon budgets.

Hardware Architecture for the System of Systems

Figure 22:
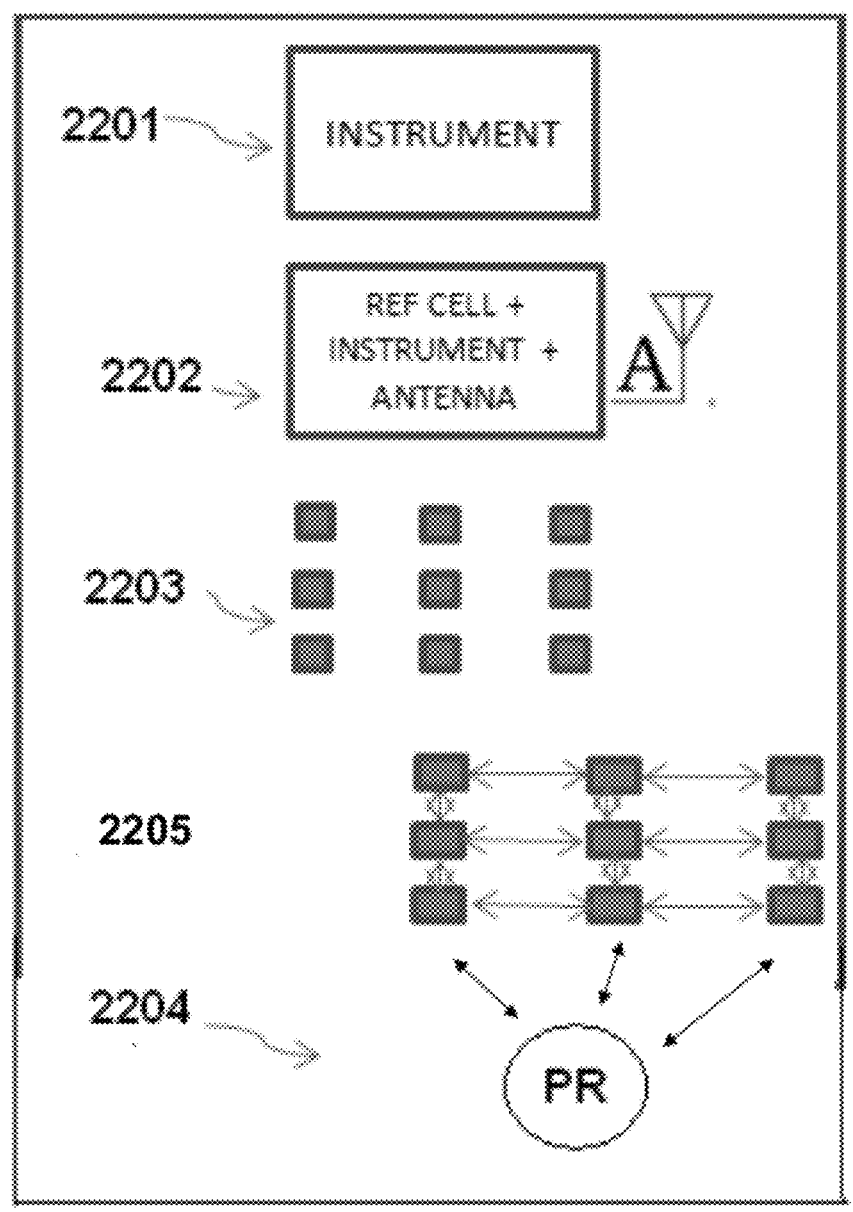
FIG. 22 is an illustration showing instrument, location and instrument inter-comparison overview and organization according to certain embodiments for a single device, devices with reference cell and telemetry antenna, an array of selected devices and an array of selected devices with inter-comparison and inter-comparability options and reference to an external primary reference (PR) standard. Additional external standards may also be incorporated in an analytical design as required to ensure comparability across instrument and across ensembles.

FIG. 22 is an illustration showing instrument, location and instrument inter-comparison overview and organization according to certain embodiments for a single device 2201, devices with reference cell and telemetry antenna 2202, an array of selected devices 2203 and an array of selected devices with inter-comparison and inter-comparability options 2205 and reference to an external primary reference (PR) standard 2205. Additional external standards may also be incorporated in an analytical design as required to ensure comparability across instrument and across ensembles.

Referring to FIG. 22 a schematic is provided showing the basic hardware components consisting of a base instrument 2201, a base instrument with sealed reference cell and telemetry capability 2202, an array of analyzers 2203 as in 2202, and an array of analyzers in a given location to measure, monitor, verify and account for carbon emissions 2205, in part effected by instantaneous communication between all analyzers to ensure comparability of data. An additional external reference cell comprising, for example, a primary reference standard may also be incorporated in the array of analyzers to provide an additional means of ensuring analyzer function and comparability of data from all analyzers.

Figure 23:
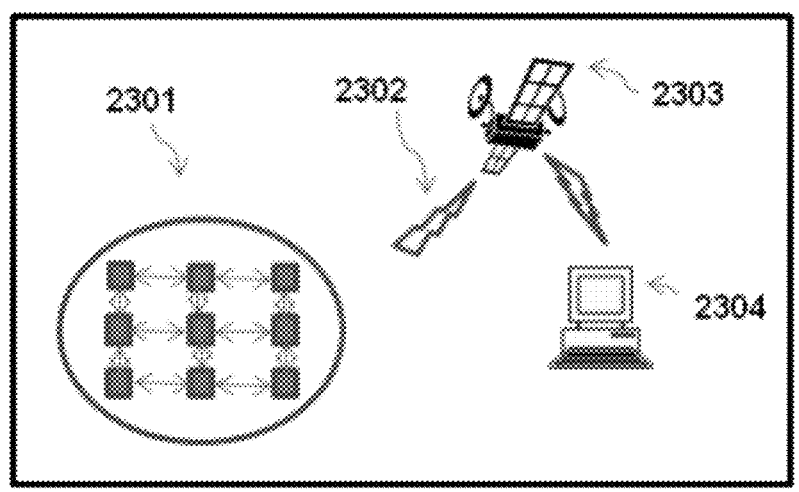
FIG. 23 is an illustration of an embodiment showing an array of inter-calibrated devices covering a specific geographic area, transmitting inter-calibrated data from each device via satellite or other wireless means to a central data and model analysis center.

Referring to FIG. 23, an array of analyzers in a given location is shown with communication between such analyzers 2301, which communicates all data via telemetry or other wireless means 2302 to a receiver, such as a satellite 2303, the data then being transmitted to a central data station or data center for analysis 2304.

Figure 24:
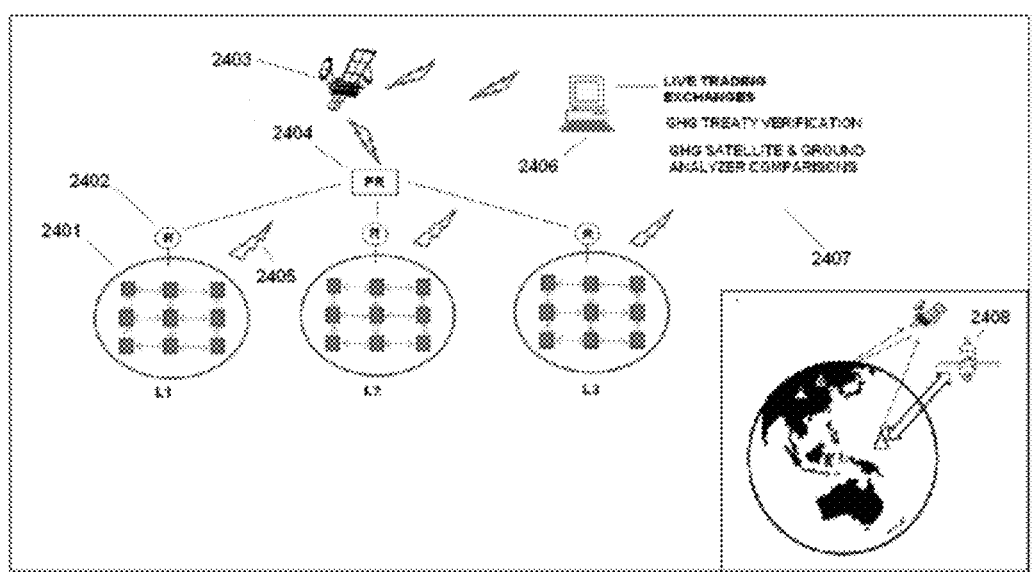
FIG. 24 is an illustration of an embodiment showing ensembles of inter-calibrated devices covering three geographic regions across the Earth (L1, L2, and L3).

FIG. 24 is an illustration of an embodiment showing ensembles of inter-calibrated devices 900 covering three geographic regions across the Earth (L1, L2, L3). The three ensembles are comprised of 9 individual analyzers that are inter-calibrated within an ensemble and across ensembles utilizing inter-calibration routines selected separate reference gases 2401, primary reference gases and/or global reference gases 2404 and optionally embodied in a separate reference gas module and, optionally, as embodied in a satellite that is used for measuring and monitoring greenhouse gases from space 2408. Data telemetry can be carried out by any wireless means 2405 including a communication satellite 2403. 2403 relays real time data from the inter-calibrated analyzers 2401, reference and/or global reference cells data 2402, 2404 to data centers and carbon trading exchanges 2406 recognizing that reference cells 2402, 2404 may have the same or different compositions of $^{13}C$ and $^{14}C$ as required depending on technical factors related to the analyzers, calibration routines and inter-calibration routines. In one embodiment such data and communications are near instantaneous providing for an electronically live carbon exchange platform 2406. Data from analyzers may also be compared with greenhouse gas sensing satellite data obtained from space 2407 offering additional verification of such data.

Referring to FIG. 24 a schematic is provided showing three geographically distinct arrays of analyzers 2401, in communication with an external reference sealed cell 2402 instrument that allows instantaneous comparison and correction to baseline and calibration data via wireless means 2405 for each instrument in the distinct arrays that may then be compared with a primary reference 2404 that is linked to well known international standards for $^{13}C$ and $^{14}C$ such as the Vienna Peedee belemnite (VPDB) standard for carbon 13 ratios (Coplen et al., 2006) and the National Bureau of Standards oxalic acid (e.g., NBS OxII) for $^{14}C$ (Scott et al., 2004). In this embodiment both external reference 2402 and primary standard sealed cells 2404 are based within the region to serve each ensemble. Data are transmitted to data centers to be integrated with models and used, for example, in one embodiment to support live trading on greenhouse gas exchanges 2406. In another embodiment reference standards as sealed cells can be housed in a satellite 2408 enabled to compare reference values for ensembles of instruments as the satellite passes over the geographic region where the land-based ensembles are placed.

Still referring to FIG. 24 passage of a satellite specifically equipped with greenhouse gas sensing capability 2408 over a region with an ensemble of analyzers may also enable direct comparisons of data for land based and satellite sensed greenhouse gas concentrations 2407. In still another embodiment referring to FIG. 17, such data as received/transmitted by a satellite for the purposes of ensuring verification of land based analyzers or for the purposes of sensing greenhouse gas concentrations at the surface, such data may be instantaneously received and transmitted to support live carbon exchange trading activity 2406 across the planet with all analyzers assured to be comparable and thus monetized in a way that accommodates all currency flows/exchanges in the same manner as occurs for stock trading across countries and currencies.

Figure 25:
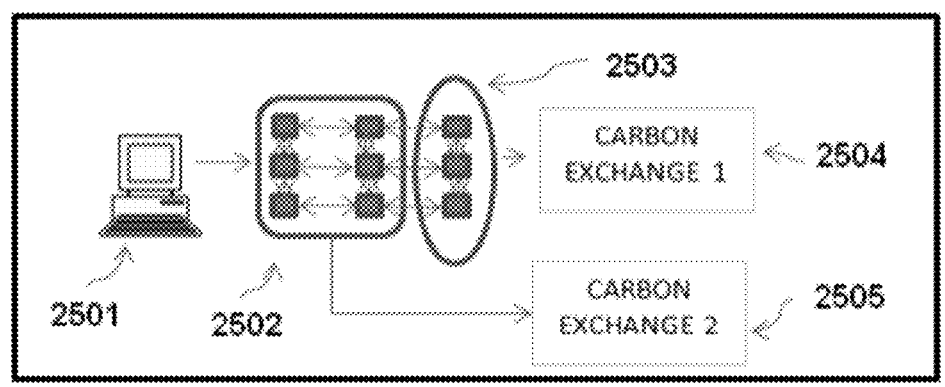
FIG. 25 shows a diagram of a data/model center according to certain embodiments producing integrated model output for specified regions at specified levels of aggregation.

FIG. 25 shows a diagram of a data/model center 2501 according to certain embodiments producing integrated model output for specified regions at specified levels of aggregation 2502, 2503. This leads to translation of data into carbon units for trading such as metric tons $CO_2$ to appropriate carbon based exchanges 2504, 2505. The data can be accessed in a live-market (e.g., instantaneous) or on a less frequent basis according to type of carbon represented, such as biogenic carbon (e.g., forest carbon) versus industrial fossil fuel based carbon, and according to trading protocols for a specific exchange.

Referring to FIG. 25 a schematic is shown in which a data station 2501 employs software and/or models of any kind that calculates the metric tons of carbon or carbon equivalents for any ensemble of analyzers or groups of analyzers 2502 and 2503 across spatial locations and according to specified time periods and providing such data to carbon exchanges 2504, 2505 located anywhere trading may be appropriate.

Figure 26:
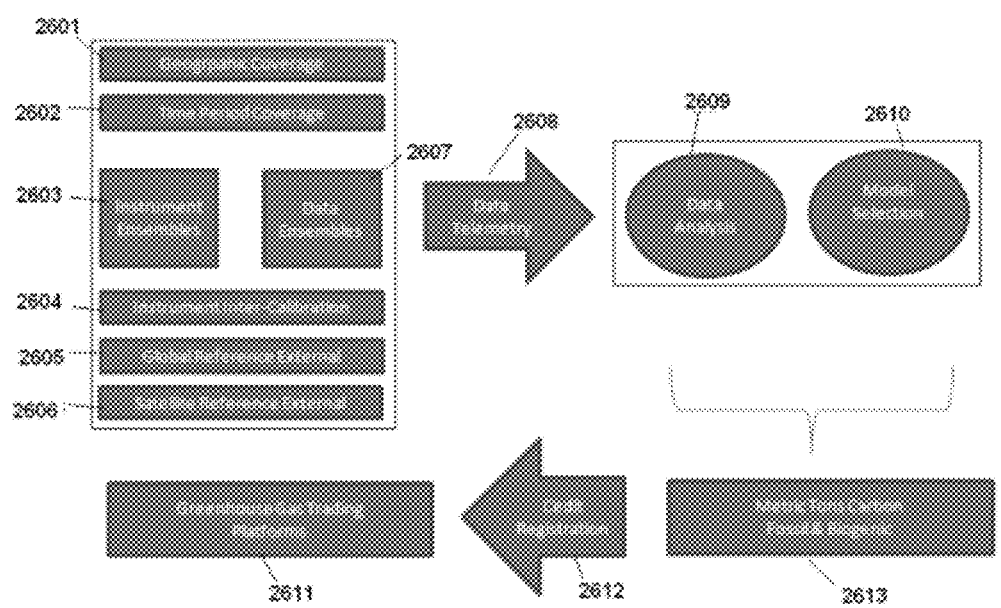
FIG. 26 shows a flow chart of the main component system processes a given geographic area and a given time period.

FIG. 26 shows a summary of the main component processes of the system of systems for a given geographic area 2601, a given time period 2602, with instruments 2603 and data from samples measured by analyzers 2607, groups or ensembles of analyzers 2603 and data ensembles 2607, shared calibration and inter-calibration protocols 2604, global reference protocol 2605 and external satellite based standards 2606. All data are transmitted via wireless or other means of telemetry 2608 to data centers that manage and incorporate the data 408 in one or more models 2610 that ultimately are converted to metric tons of biogenic or fossil fuel derived carbon 2613. Such units can be registered and other administratively handled 2612 for sale on an appropriate greenhouse gas trading exchanges, platforms, etc. 2611.

FIG. 26 shows a summary of the main component processes of the system of systems for a given geographic area 2601, a given time period 2602, with instruments 2603 and data from samples measured by analyzers 2607, groups or ensembles of analyzers 2603 and data ensembles 2607, shared calibration and inter-calibration protocols 2604, global reference protocols 2605, and external satellite based reference standards 2606. All data are transmitted via wireless or other means of telemetry 2608 to data centers that manage and incorporate the data 2609 in one or more models 2610 that ultimately are converted to metric tons of biogenic or fossil fuel derived carbon 2613. Such units can be registered as credits according to the rules of a given trading system 2612 for sale on an appropriate greenhouse gas trading exchanges, platforms 2611.

Figure 27:
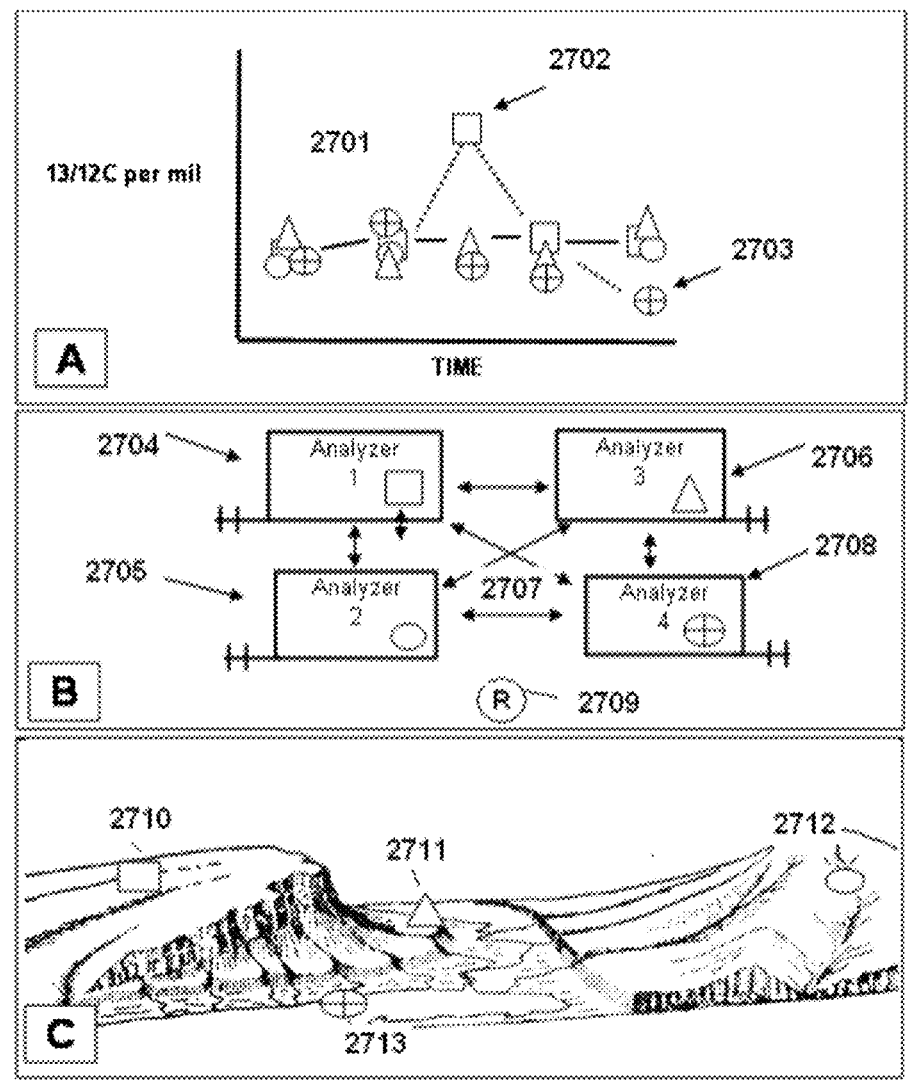
FIG. 27 shows an example of inter-calibration architecture resulting in a $^{13}C$ data set (panel A) from different analyzers (panel B).

FIG. 27 shows an example of inter-calibration architecture resulting in a $^{13}$C data set (panel A) 2701 from the analyzers 2704, 2705, 2706 and 2708 (panel B). The analyzers 2704, 2705, 2706 and 2708 are placed in discrete locations (panel C). Analyzers 2704, 2705, 2706 and 2708 may also be integrated with an optional external reference and/or global reference gas module 2709 to ensure comparability across instruments in time and space.

In FIG. 27, panel A, illustrates hypothetical isotope data for $^{13}$C/$^{12}$C and $^{14}$C/$^{12}$C ratios resulting from four instruments in different locations covering five points in time. The data for the four instruments, denoted by symbols (squares, circles, cross-hatched circles and triangles) are shown in Panel A with solid lines 2701 connecting data of similar trend and dotted lines connecting data recognized as outliers 2702 and 2703. A feature of the software control protocols according to certain embodiments is to recognize outlier data as it is produced in each instrument and recognized by routine calibration curves, primary standards and external standards.

Thus, in Panel A, the outliers above and below the trend line (2702 and 2703) would be eliminated from the corresponding data stream and instrument primary data record, although retained in an appropriate file. In some embodiments, each of the instruments (2704, 2705, 2706, and 2708) may also be referenced to an external primary reference cell 2709, or may be compared with satellite space based measurements representing an additional method to cross check data results in real time and providing a global reference data point. Referring to Panel B, it can be seen further that when such data quality and assurance programs are applied to each instrument 2704, 2705, 2706, 2708 within an array, a software program can be devised to query each instrument against any other instrument 2707 (represented by cross arrows between each pair of devices) verifying normal function and otherwise eliminating outliers or other conditions during which data are either not collected or a malfunction is registered. Such controls are essential to ensure comparability for analyzers (2710, 2711, 2712, and 2713) that are located far from each other and in different environments (Panel C).

Thus, according to certain embodiments, for defined intervals over time and space all outlier data for all instruments in an array are eliminated from the primary data set, thus producing a network or data fabric that is quality assured. Nonconforming data may be set to trigger an alarm signifying that the instrument is not functioning properly. Such protocols for arrays of instruments are well known to one skilled in the art of instrument controls and software control of such devices according to set protocols. For example, the National Instrument Company, Austin, Tex. (www.ni.com) offers Lab View (e.g., Model 8.6), a well known instrument control software package, that allows custom data acquisition, manipulation and interactive control of instruments to accomplish complex routines such as those described above.

This protocol, which can be run automatically in real time using advanced wireless control protocols as described below, represents an inter-calibration routine that promotes successful performance of a system of systems disclosed herein. Note that in Panel C, the location of the four instruments is such that any combination of data from the locations may be employed to generate aggregated data and results suitable for carbon trading. The discrete location data representing one or more locations may be used to reduce or expand the spatial footprint or to track rapid changes in a single location depending on other factors including environmental conditions. The inter-calibration routine may be applied to any number of devices located in arrays in many disparate locations around the world and disparate trading networks such as the EU ETS and RGGI carbon trading platforms as referenced previously. Such a network or fabric of data can then be integrated with appropriate models to further aggregate and interpolate data to provide cumulative carbon fluxes over defined spatial and temporal domains. Thus, the system of systems, according to certain embodiments, offers self regulating calibration and inter-calibration routines to ensure data comparability in a way that has not been implemented to date for the rare forms of carbon as disclosed herein.

System Architecture for Data Communication and Transmission Using SCADA

The term SCADA stands for Supervisory Control And Data Acquisition. Such systems are readily available commercially from vendors such as Bentek Systems, Inc., Alberta, Canada (www.scadalink.com). A SCADA system is a common process automation system which is used to gather data from sensors and instruments located at remote sites and to transmit and display this data at a central site for either control or monitoring purposes. In the certain embodiments, referring to FIG. 28, a SCADA system is used to control and monitor isotopic data resulting from the isotopic analyzers 2803 as disclosed herein. The collected data is usually viewed on one or more master SCADA Host computers 2811 located at the central or master site with options for intermediate host computers 2809 such as regional areas that may be employing widely separated networks of isotopic monitors. A real world SCADA system can monitor and control hundreds of thousands of input/output (I/O) points. A typical SCADA application for a system of systems as described herein would be to monitor devices producing isotopic composition for $^{13}$C and $^{14}$C isotope ratios, calibration and data transmission for one or more devices in a given network and for all networks. The various software and hardware features of the individual devices and communication within a network of devices are controlled by employing both analog and digital signals.

In at least some embodiments utilizing remote sites and/or disparate groups of sites, another layer of equipment between the remote sensors and instruments and the central computer is employed. This intermediate equipment exists on the remote side and connects to the sensors and field instruments. The device sensors will typically have digital or analog I/O and these signals are not in a form that can be easily communicated over long distances. The intermediate equipment is used to digitize then packetize the sensor signals so that they can be digitally transmitted via an industrial communications protocol over long distances to the central site. Typical equipment, well known to those skilled in the art of SCADA, that handles this function are PLC's (Programmable Logic Controllers) and RTU's (Remote Terminal Units) commonly housed in the same instrument box or RTU 2803. In certain embodiments, isotopic analyzers spread across one or more landscapes will be classified as RTU's 2803 equipped with PLC's. The RTU and PLC is equipped with the appropriate SCADA communication device 2801. One such SCADA device, common in the industry and well known to those skilled in the art of SCADA communications devices is the SCADALink 900-MB RTU/radio modem enabling wide-area, remote, point-multi-point SCADA communication systems sold by Bentek Systems, Inc., of Alberta, Canada. These devices employ de facto standard industrial data communication protocols such as Modbus, AB-DF1, and DNP3.0 to transmit the sensor data, all well known to those skilled in the art of communication protocols. Typical physical interface standards are Bel 202 modem, RS-485 & RS-232, also well known to those skilled in the art of interface standards.

Typically a SCADA system consists of four major elements:
 1. Master Terminal Unit (MTU) 2811
 2. Remote Terminal Unit (RTU) 2803
 3. Communication Equipment 2801
 4. SCADA Software The Master Terminal Unit 2811 is usually defined as the master or heart of a SCADA system and is located at the operator's central control facility. In the illustrated embodiment the MTU represents the primary control and operations center that monitors, controls, receives and processes data that is produced by the isotopic analyzers. The MTU initiates virtually all communication with remote sites and interfaces with an operator. Data from remote field devices ($^{13}$C, $^{14}$C, $CO_2$ concentration data, calibration routines, alarm conditions, etc.) is sent to the MTU to be processed, stored and/or sent to other systems. For example, in the present case the MTU may send the data to regional carbon trading platforms anywhere on the planet.

As discussed earlier, the Remote Terminal Unit 2803 is usually defined as a communication satellite or node within the SCADA system and is located at the remote site; in this case representing individual isotopic analyzers across the landscape. The RTU gathers data from each of the field devices in memory until the MTU 2811 initiates a send command such as a command to transmit isotopic data for a given period of time from one or more field isotopic analyzers 2803 or one or more intermediate data collection sites 2809. In one embodiment, isotopic analyzers may be equipped with microcomputers and programmable logic controllers (PLCs) that can perform functions at the remote site without any direction from the MTU and is considered herein as part of the RTU 2803. In addition, PLCs can be modular and expandable for the purpose of measuring, monitoring and controlling additional field devices. Thus, in the present case, in one embodiment, a regional ensemble of many RTUs 2803 will be equipped with PLCs to specifically measure and monitor calibration, inter-calibration and reference routines and may also allow control functions, site condition reports, re-programming capacity and alarm functions for one or more isotopic analyzers. Within the RTU 2803 is the central processing unit (CPU) that receives a data stream from the protocol that the communication equipment uses. The protocol can be open such as Modbus, Transmission Control Protocol and Internet Protocol (TCP/IP) or a proprietary closed protocol; all aforesaid protocols are well known to one skilled in the art of data transmission protocols. When the RTU 2803 sees its node address embedded in the protocol, data is interpreted and the CPU directs the specified action to take. All functions, thus, can be carried out from one or more master sites controlling any number of isotopic analyzers.

In various embodiments, the way the SCADA system network or topology is set up can vary, but each system relies on uninterrupted, bidirectional communication between the MTU and the RTU. This can be accomplished in various ways, e.g., private wire lines, buried cable, telephone, radios, modems, microwave dishes, wireless/cellular 2810, satellites 2806, or other atmospheric means, and many times, systems employ more than one means of communicating to the remote site. This may include dial-up or dedicated voice grade telephone lines, DSL (Digital Subscriber Line), Integrated Service Digital Network (ISDN), cable, fiber optics, Wi-Fi, or other broadband services. A system of systems as disclosed herein can make use of all communication systems covering local, regional and remote sites as is well known to those skilled in the art of SCDA systems.

A typical SCADA system provides a Human Machine Interface (HMI) 2816 allowing the operator to visualize functions as the system is operating. Accordingly, in the present disclosure, visualization may include, without limitation, contour surfaces of carbon flux, calibration and inter-calibration routines, or simply carbon flux data in metric tons of Carbon attributed to either biogenic or industrial sources for a given array of devices over a given time period. In certain embodiments, the operator can also use the HMI to change set points, view critical condition alerts and warnings, and analyze, archive or present data trends. Since the advent of Windows NT, the HMI software can be installed on PC hardware as a reliable representation of the real system at work. Common HMI software packages include Cimplicity (GE-Fanuc), RSView (Rockwell Automation), IFIX (Intellution) and InTouch (Wonderware). Most of these software packages use standard data manipulation/presentation tools for reporting and archiving data and integrate well with Microsoft Excel, Access and Word. Web-based technology is also accepted as well. Data collected by the SCADA system can be sent to web servers that dynamically generate HTML pages. These pages are then sent to a LAN system at the operator's site or published to the Internet. In the illustrated embodiment, the data after being received by the MTU 2811 will be used to generate carbon flux data compatible for use in one or more carbon exchange platforms 2815.

Figure 28:
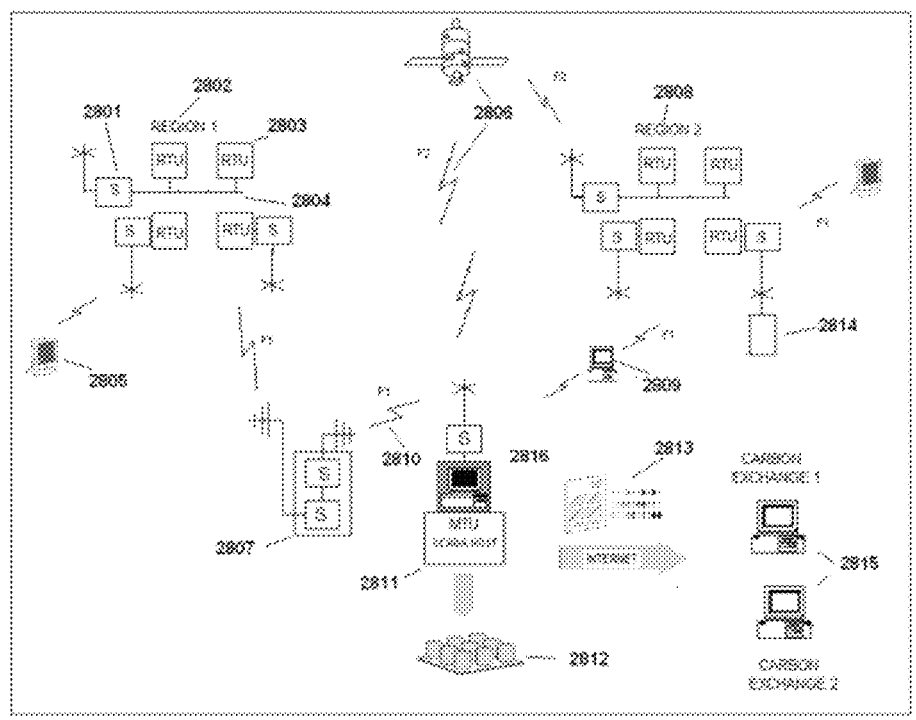
FIG. 28 shows an example of SCADA communication and network architecture for data transmission from individual or grouped isotopic analyzers, comparison with optional external primary reference standard, collection of such data by a master host and subsequent transmission to carbon exchanges.

In summary, referring to FIG. 28, a number of isotopic analyzers are placed in the field in two separate locations 2802, 2808, all employing an instrument architecture supporting a PLC within the RTU 2803 instrument housing. In one embodiment, each discrete location with an RTU is equipped with a SCADA communicator 2801. In another embodiment, RTUs that are close enough to be wired to each other 2804 may employ a single SCADA unit for communications. In still another embodiment, handheld computers 2805 within a given network may also monitor data by wireless or other means. In another embodiment, in which wireless communication is involved, a repeater unit 2807, available from Bentek Systems, Alberta, Canada, and model SCADALink SMX-900, may be involved to boost the signal for final transmission to the MTU 2811. In yet another embodiment, an intermediate MTU 2809 is used to capture data prior to transmission to the primary MTU 2811. In yet another embodiment, a solar powered SCADA communications unit 2814 may be employed in remote areas with limited electrical connectivity, using for example, the Solar SCADA Link, available from Bentek Systems, Alberta, and Canada. Data communications may be effected by wireless transmission 2810 or satellite 2806 systems. The data are received by the primary MTU 2811 and rendered in a variety of displays, including but not limited to contour surfaces for carbon flux, charts, graphs and three-dimensional visualizations within the human machine interface, HMI, 2816. Appropriate data products resulting from the use of mathematical calculations and models finally yield carbon flux data in metric tons, specifying both biogenic and anthropogenic/industrial components as sources or sinks for a given spatial and temporal domain. Such data are encrypted 2813 and transmitted to carbon exchanges 2815. Data is automatically stored within a variety of on-site and off-site databases 2813.

It will be understood that the foregoing is only illustrative of the principles of the invention, and that various modifications can be made by those skilled in the art without departing from the scope and spirit of the invention.

The invention claimed is:

1. A method for greenhouse gas (GHG) trading comprising:
    providing at least one geographically defined biosphere box comprising at least one of a terrestrial and an aquatic ecosystem, wherein the at least one geographically defined biosphere box is compartmentalized into at least one GHG reservoir;
    measuring at least one GHG flux in the at least one GHG reservoir by a measuring system that comprises:
        an array of analyzers placed in predetermined representative locations throughout the at least one GHG reservoir, wherein each analyzer measures at least one GHG flux in the at least one GHG reservoir by measuring a released and a sequestered amount of GHG in the at least one GHG reservoir; and
        a standard reference module for defining for the at least one geographically defined biosphere box a first baseline GHG flux;
    comparing the at least one measured GHG flux of the at least one GHG reservoir with the first baseline to generate at least one first resultant GHG flux data of the at least one geographically defined biosphere box using a data processing system; and
    defining a closed-end fund comprising a plurality of traded items wherein each traded item corresponds to the at least one first resultant GHG flux data of the at least one geographically defined biosphere box using the data processing system.

2. The method of claim 1, wherein measuring the at least one GHG flux further comprises at least one of measuring GHG in the air and soil of the terrestrial ecosystem and measuring GHG in dissolved water in the aquatic ecosystem.

3. The method of claim 1, wherein measuring the at least one GHG flux further comprises at least one of real-time monitoring, real-time verification, and real-time accounting of GHG in the at least one GHG reservoir over at least one annual cycle to facilitate near instantaneous definition of the closed-end fund.

4. The method of claim 1, wherein measuring the at least one GHG flux further comprises sampling of GHG measurements having a frequency of less than 10Hz.

5. The method of claim 1, further comprising:
    defining for the at least one geographically defined biosphere box a second baseline GHG flux relative to zero net GHG sequestration;
    defining for the at least one geographically defined biosphere box a third baseline GHG flux relative to a composition of the isotopic forms of the Kyoto greenhouse gases;
    defining for the at least one geographically defined biosphere box a fourth baseline GHG flux relative to at least one of a local, a regional, a continental and a global indicator of net GHG flux within the at least one geographically defined biosphere box;
    comparing the at least one measured GHG flux of the at least one GHG reservoir with the second baseline GHG flux to generate at least one second resultant GHG flux data of the at least one geographically defined biosphere box;
    comparing the at least one measured GHG flux of the at least one GHG reservoir with the third baseline GHG flux to generate at least one third resultant GHG flux data of the at least one geographically defined biosphere box;
    comparing the at least one measured GHG flux of the at least one GHG reservoir with the fourth baseline GHG flux to generate at least one fourth resultant GHG flux data of the at least one geographically defined biosphere box;
    ensuring permanence of the at least one GHG reservoir within the at least one geographically defined biosphere box;
    preventing leakage of the released and the sequestered GHG outside the at least one geographically defined biosphere box; and
    wherein each traded item further corresponds to at least one of the at least one second, third, and fourth resultant GHG flux data of the at least one geographically defined biosphere box.

6. The method of claim 1, wherein the at least one GHG reservoir is located at at least one of a location on the planet, a location within the planet, and a location above the planet.

7. The method of claim 1, wherein a net asset value of a traded item from the plurality of traded items is determined by investor demand for the at least one GHG reservoir.

8. The method of claim 1, further comprising enabling modification of the at least one of a terrestrial and an aquatic ecosystem to increase sequestration of GHG.

9. The method of claim 1, further comprising determining a rate of GHG sequestration based on the first baseline within at least one of a region, a state, and a country.

10. The method of claim 9, further comprising managing the rate of GHG sequestration based on the first baseline within the at least one of a region, a state, and a country.

11. The method of claim 10, further comprising setting pricing levels for sequestered GHG based on the first baseline within the at least one of a region, a state, and a country.

12. The method of claim 1, wherein the closed-end fund further comprises auctioned items.

13. The method of claim 1, wherein said GHG comprises at least one of a carbon dioxide ($CO_2$), nitrous oxide ($N_2O$), methane (CH4), sulfur hexafluoride (SF6), perfluorocarbons (PFC's), and hydrofluorocarbons.

14. A system for generating greenhouse gas (GHG) tradable products comprising:
(a) a measuring system configured to measure at least one GHG flux in at least one GHG reservoir of at least one geographically defined biosphere box comprising at least one of a terrestrial and an aquatic ecosystem, wherein the at least one geographically defined biosphere box is compartmentalized into the at least one GHG reservoir, wherein the measuring system comprises:
an array of analyzers placed in predetermined representative locations throughout the at least one GHG reservoir, wherein each analyzer measures at least one GHG flux in the at least one GHG reservoir by measuring a released and a sequestered amount of GHG in the at least one GHG reservoir; and
a standard reference module for defining for the at least one geographically defined biosphere box a first baseline GHG flux; and
(b) a data processing system configured to:
compare the at least one measured GHG flux of the at least one GHG reservoir with the first baseline to generate at least one first resultant GHG flux data of the at least one geographically defined biosphere box, and
define a closed-end fund comprising a plurality of traded items wherein each traded item corresponds to the at least one first resultant GHG flux data of the at least one geographically defined biosphere box.

15. The system of claim 14, wherein each analyzer measures the at least one GHG flux in the at least one GHG reservoir by measuring at least one of GHG in the air and soil of the terrestrial ecosystem, and GHG in dissolved water in the aquatic ecosystem.

16. The system of claim 14, wherein each analyzer measures the at least one GHG flux in the at least one GHG reservoir by one of real-time monitoring, real-time verification, and real-time accounting of GHG in the at least one GHG reservoir over at least one annual cycle to facilitate near instantaneous definition of the closed-end fund.

17. The system of claim 14, wherein each analyzer measures the at least one GHG flux in the at least one GHG reservoir by sampling measurements of GHG having a frequency of less than 10Hz.

18. The system of claim 14, wherein the data processing system is further configured to:
compare the at least one measured GHG flux of the at least one GHG reservoir with a second baseline GHG flux relative to zero net GHG sequestration to generate at least one second resultant GHG flux data of the at least one geographically defined biosphere box;
compare the at least one measured GHG flux of the at least one GHG reservoir with a third baseline GHG flux relative to a composition of the isotopic forms of the Kyoto greenhouse gases to generate at least one third resultant GHG flux data of the at least one geographically defined biosphere box;
compare the at least one measured GHG flux of the at least one GHG reservoir with a fourth baseline GHG flux relative to at least one of a local, a regional, a continental and a global indicator of net GHG flux within the at least one geographically defined biosphere box to generate at least one fourth resultant GHG flux data of the at least one geographically defined biosphere box;
ensure permanence of the at least one GHG reservoir within the at least one geographically defined biosphere box;
prevent leakage of the released and the sequestered GHG outside the at least one geographically defined biosphere box; and
wherein each traded item further corresponds to at least one of the at least one second, third, and fourth resultant GHG flux data of the at least one geographically defined biosphere box.

19. The system of claim 14, wherein the at least one GHG reservoir is located at at least one of a location on the planet, a location within the planet, and a location above the planet.

20. The system of claim 14, wherein a net asset value of a traded item from the plurality of traded items is determined by investor demand for the at least one GHG reservoir.

21. The system of claim 14, wherein the at least one of a terrestrial and an aquatic ecosystem is modified to increase sequestration of GHG.

22. The system of claim 14, wherein the measuring system is further configured to determine a rate of GHG sequestration based on the first baseline within at least one of a region, a state, and a country.

23. The system of claim 22, wherein the measuring system is further configured to manage the rate of GHG sequestration based on the first baseline within the at least one of a region, a state, and a country.

24. The system of claim 23, wherein the measuring system is further configured to set pricing levels for sequestered GHG based on the first baseline within the at least one of a region, a state, and a country.

25. The system of claim 14, wherein the closed-end fund further comprises auctioned items.

26. The system of claim 14, wherein said GHG comprises at least one of a carbon dioxide ($CO_2$), nitrous oxide ($N_2O$), methane (CH4), sulfur hexafluoride (SF6), perfluorocarbons (PFC's), and hydrofluorocarbons.

* * * * *